US010669417B2

(12) United States Patent
Kann et al.

(10) Patent No.: US 10,669,417 B2
(45) Date of Patent: Jun. 2, 2020

(54) RECYCLATE BLENDS

(71) Applicant: CJ CHEILJEDANG CORPORATION, Seoul (KR)

(72) Inventors: Yelena Kann, Marblehead, MA (US); David Boudreau, Old Orchard Beach, ME (US)

(73) Assignee: CJ CHEILJEDANG CORPORATION, Seoul (KR)

( * ) Notice: Subject to any disclaimer, the term of this patent is extended or adjusted under 35 U.S.C. 154(b) by 159 days.

(21) Appl. No.: 14/894,019

(22) PCT Filed: May 30, 2014

(86) PCT No.: PCT/US2014/040278
§ 371 (c)(1),
(2) Date: Nov. 25, 2015

(87) PCT Pub. No.: WO2014/194220
PCT Pub. Date: Dec. 4, 2014

(65) Prior Publication Data
US 2016/0108233 A1  Apr. 21, 2016

Related U.S. Application Data

(60) Provisional application No. 61/828,845, filed on May 30, 2013, provisional application No. 61/844,911, filed on Jul. 11, 2013, provisional application No. 61/889,833, filed on Oct. 11, 2013, provisional application No. 61/900,540, filed on Nov. 6, 2013.

(51) Int. Cl.
*C08L 67/04* (2006.01)
*C08L 27/06* (2006.01)
*C08L 101/00* (2006.01)
*C08J 11/04* (2006.01)

(52) U.S. Cl.
CPC ............... *C08L 67/04* (2013.01); *C08J 11/04* (2013.01); *C08L 27/06* (2013.01); *C08L 101/00* (2013.01); *C08J 2327/06* (2013.01); *C08J 2467/04* (2013.01); *Y02P 20/143* (2015.11); *Y02W 30/70* (2015.05)

(58) Field of Classification Search
CPC ........ C08L 27/06; C08L 67/04; C08L 101/00; C08J 11/04; C08J 2327/06; C08J 2467/04
USPC .......................................................... 524/513
See application file for complete search history.

(56) References Cited

U.S. PATENT DOCUMENTS

| | | |
|---|---|---|
| 2,744,095 A | 5/1956 | Caldwell |
| 3,563,971 A | 2/1971 | Brown et al. |
| 3,592,877 A | 7/1971 | Mullins |
| 3,904,579 A | 9/1975 | Braddicks |
| 3,954,839 A | 5/1976 | Dexter et al. |
| 3,962,377 A | 6/1976 | Spivack |
| 4,076,910 A | 2/1978 | Beck |
| 4,096,122 A | 6/1978 | Schade et al. |
| 4,132,707 A | 1/1979 | Borman |
| 4,145,466 A | 3/1979 | Leslie et al. |
| 4,393,167 A * | 7/1983 | Holmes ............... C08G 63/06 525/186 |
| 4,463,113 A | 7/1984 | Nakahara et al. |
| 4,477,654 A | 10/1984 | Holmes et al. |
| 4,511,687 A | 4/1985 | Nakanishi et al. |
| 4,536,531 A | 8/1985 | Ogawa et al. |
| 4,562,245 A | 12/1985 | Stageman |
| 4,589,223 A | 5/1986 | Hastings |
| 4,596,886 A | 6/1986 | Hasegawa et al. |
| 4,617,373 A | 10/1986 | Pruett et al. |
| 4,655,768 A | 4/1987 | Marecki et al. |
| 4,797,440 A | 1/1989 | Schofield et al. |
| 4,804,691 A | 2/1989 | English et al. |
| 4,859,365 A | 8/1989 | Peninger |
| 4,946,930 A | 8/1990 | Takasa et al. |
| 4,968,611 A | 11/1990 | Traussnig et al. |
| 4,999,388 A | 3/1991 | Okamoto |
| 5,000,991 A | 3/1991 | Hayashi et al. |
| 5,043,192 A | 8/1991 | Jones et al. |
| 5,068,140 A | 11/1991 | Malhotra et al. |
| 5,110,844 A | 5/1992 | Hayashi et al. |
| 5,112,890 A | 5/1992 | Behrens et al. |

(Continued)

FOREIGN PATENT DOCUMENTS

| | | |
|---|---|---|
| CA | 2234965 A1 | 5/1997 |
| CN | 1771291 A | 5/2006 |

(Continued)

OTHER PUBLICATIONS

Final Office Action for U.S. Appl. No. 14/094,150, "Biobased Modifiers for Polyvinylchloride Blends," dated Apr. 1, 2016.
Final Office Action for U.S. Appl. No. 14/422,135, "Biobased Rubber Modifiers for Polymer Blends," dated Apr. 1, 2016.
Final Office Action for U.S. Appl. No. 10/783,958 dated Oct. 29, 2009.
Final Office Action for U.S. Appl. No. 10/783,995 dated Jan. 26, 2010.

(Continued)

*Primary Examiner* — Angela C Scott
(74) *Attorney, Agent, or Firm* — Christensen, Fonder, Dardi; Diane E. Bennett; Peter S. Dardi

(57) ABSTRACT

Compositions comprising recyclate blends of polymer recyclate and polyester additives are described. In certain embodiments, the polyester additive is a PHA such as a poly-3-hydroxybutyrate-co-4-hydroxybutyrate copolymer having a weight percent 4-hydroxybutyrate of 8.5-45%. In other embodiments the PHA is mixed with the recyclate polymer at concentrations of 10-50% by weight of the recyclate blend. Methods of making the compositions of the invention are also described. The invention also includes articles made from the recyclate blends.

15 Claims, No Drawings

(56) References Cited

U.S. PATENT DOCUMENTS

| | | |
|---|---|---|
| 5,128,383 A | 7/1992 | Amano et al. |
| 5,134,028 A | 7/1992 | Hayashi et al. |
| 5,169,889 A | 12/1992 | Kauffman et al. |
| 5,191,037 A | 3/1993 | Doi et al. |
| 5,192,612 A | 3/1993 | Otter et al. |
| 5,202,205 A | 4/1993 | Malhota |
| 5,213,976 A | 5/1993 | Blauhut et al. |
| 5,252,646 A | 10/1993 | Iovine et al. |
| 5,262,725 A | 11/1993 | Cuppen et al. |
| 5,312,850 A | 5/1994 | Iovine et al. |
| 5,342,868 A | 8/1994 | Kimura et al. |
| 5,382,679 A | 1/1995 | Galzigna |
| 5,387,623 A | 2/1995 | Ryan et al. |
| 5,395,919 A | 3/1995 | Lee et al. |
| 5,446,079 A | 8/1995 | Buchanan et al. |
| 5,480,394 A | 1/1996 | Ishikawa |
| 5,502,116 A | 3/1996 | Noda |
| 5,502,158 A | 3/1996 | Sinclair et al. |
| 5,516,565 A | 5/1996 | Matsumoto |
| 5,519,066 A | 5/1996 | McConnell et al. |
| 5,536,419 A | 7/1996 | Escalona et al. |
| 5,536,564 A | 7/1996 | Noda |
| 5,550,173 A | 8/1996 | Hammond et al. |
| 5,580,911 A | 12/1996 | Buchanan et al. |
| 5,599,858 A | 2/1997 | Buchanan et al. |
| 5,608,031 A | 3/1997 | Yau et al. |
| 5,614,576 A | 3/1997 | Rutherford et al. |
| 5,645,752 A | 7/1997 | Weiss et al. |
| 5,646,217 A | 7/1997 | Hammond |
| 5,656,367 A | 8/1997 | Iovine et al. |
| 5,658,646 A | 8/1997 | Takano et al. |
| 5,693,285 A | 12/1997 | Ishii et al. |
| 5,693,389 A | 12/1997 | Liggat |
| 5,700,344 A | 12/1997 | Edgington et al. |
| 5,711,842 A | 1/1998 | Kemmish |
| 5,750,605 A | 5/1998 | Blumenthal et al. |
| 5,753,343 A | 5/1998 | Braun et al. |
| 5,753,364 A | 5/1998 | Rutherford et al. |
| 5,753,724 A | 5/1998 | Edgington et al. |
| 5,789,536 A | 8/1998 | Liggat et al. |
| 5,800,897 A | 9/1998 | Sharma et al. |
| 5,821,299 A | 10/1998 | Noda |
| 5,824,693 A | 10/1998 | Goldberg |
| 5,853,876 A | 12/1998 | Takano et al. |
| 5,866,634 A | 2/1999 | Tokushige et al. |
| 5,894,062 A | 4/1999 | Liddell |
| 5,922,357 A | 7/1999 | Coombes et al. |
| 5,942,597 A | 8/1999 | Noda et al. |
| 5,952,088 A | 9/1999 | Tsai et al. |
| 5,952,405 A | 9/1999 | Schoenberg et al. |
| 5,973,038 A | 10/1999 | Weaver et al. |
| 5,973,100 A | 10/1999 | Asrar et al. |
| 5,985,952 A | 11/1999 | Levy |
| 5,994,478 A | 11/1999 | Asrar et al. |
| 6,018,004 A | 1/2000 | Warzelhan et al. |
| RE36,548 E | 2/2000 | Noda |
| 6,043,063 A | 3/2000 | Kurdikar et al. |
| 6,071,450 A | 6/2000 | Topolkaraev et al. |
| 6,083,729 A | 7/2000 | Martin et al. |
| 6,086,997 A | 7/2000 | Patel et al. |
| 6,087,471 A | 7/2000 | Kurdikar et al. |
| 6,096,809 A | 8/2000 | Lorcks et al. |
| 6,096,810 A | 8/2000 | Asrar et al. |
| 6,110,849 A | 8/2000 | Tsai et al. |
| 6,111,006 A | 8/2000 | Waddington |
| 6,111,060 A | 8/2000 | Gruber et al. |
| 6,114,042 A | 9/2000 | Warzelhan et al. |
| 6,135,987 A | 10/2000 | Tsai et al. |
| 6,156,852 A | 12/2000 | Asrar et al. |
| 6,174,990 B1 | 1/2001 | Noda |
| 6,177,062 B1 | 1/2001 | Stein et al. |
| 6,191,203 B1 | 2/2001 | Asrar et al. |
| 6,192,892 B1 | 2/2001 | Resler |
| 6,197,749 B1 | 3/2001 | Hamuro et al. |
| 6,201,034 B1 | 3/2001 | Warzelhan et al. |
| 6,201,083 B1 | 3/2001 | Asrar et al. |
| 6,221,316 B1 | 4/2001 | Hanggi et al. |
| 6,228,934 B1 | 5/2001 | Horowitz et al. |
| 6,228,954 B1 | 5/2001 | Kaplan et al. |
| 6,235,815 B1 | 5/2001 | Loercks et al. |
| 6,235,816 B1 | 5/2001 | Lorcks et al. |
| 6,248,862 B1 | 6/2001 | Asrar et al. |
| 6,290,803 B1 | 9/2001 | Maksymkiw et al. |
| 6,303,677 B1 | 10/2001 | Warzelhan et al. |
| 6,306,904 B1 | 10/2001 | Gordziel |
| 6,307,003 B1 | 10/2001 | Grigat et al. |
| 6,319,352 B1 | 11/2001 | Simmler et al. |
| 6,340,580 B1 | 1/2002 | Horowitz |
| 6,342,304 B1 | 1/2002 | Buchanan et al. |
| 6,365,680 B1 | 4/2002 | Edgington et al. |
| 6,369,106 B1 | 4/2002 | Atlas et al. |
| 6,388,025 B1 | 5/2002 | Perego et al. |
| 6,423,250 B1 | 7/2002 | Blount |
| 6,472,497 B2 | 10/2002 | Loercks et al. |
| 6,472,502 B1 | 10/2002 | Jurgens et al. |
| 6,479,467 B1 | 11/2002 | Buchanan et al. |
| 6,515,054 B1 | 2/2003 | Matsushita et al. |
| 6,538,059 B1 | 3/2003 | Muller et al. |
| 6,552,124 B2 | 4/2003 | Wang et al. |
| 6,562,938 B2 | 5/2003 | Haile et al. |
| 6,579,934 B1 | 6/2003 | Wang et al. |
| 6,585,819 B2 | 7/2003 | Zhao |
| 6,586,404 B1 | 7/2003 | Demopolos et al. |
| 6,592,892 B1 | 7/2003 | Williams |
| 6,620,869 B2 | 9/2003 | Asrar et al. |
| 6,623,854 B2 | 9/2003 | Bond |
| 6,699,931 B2 | 3/2004 | Kuo et al. |
| 6,703,115 B2 | 3/2004 | Hale et al. |
| 6,706,674 B2 | 3/2004 | Cincotta et al. |
| 6,706,942 B1 | 3/2004 | Zhao et al. |
| 6,709,848 B1 | 3/2004 | Martin et al. |
| 6,727,314 B2 | 4/2004 | Burghart et al. |
| 6,743,506 B2 | 6/2004 | Bond et al. |
| 6,746,766 B2 | 6/2004 | Bond et al. |
| 6,767,972 B1 | 7/2004 | Irick, Jr. et al. |
| 6,770,702 B1 | 8/2004 | Muller et al. |
| 6,780,911 B2 | 8/2004 | Zhong et al. |
| 6,783,854 B2 | 8/2004 | Bond |
| 6,803,443 B1 | 10/2004 | Ariga et al. |
| 6,808,795 B2 | 10/2004 | Noda et al. |
| 6,818,295 B2 | 11/2004 | Bond et al. |
| 6,818,723 B2 | 11/2004 | Sacripante |
| 6,830,810 B2 | 12/2004 | Bond |
| 6,838,037 B2 | 1/2005 | Autran et al. |
| 6,841,597 B2 | 1/2005 | Bastioli et al. |
| 6,844,390 B2 | 1/2005 | Kuo et al. |
| 6,880,320 B2 | 4/2005 | Olinger et al. |
| 6,906,164 B2 | 6/2005 | DeBruin |
| 6,918,927 B2 | 7/2005 | Bates et al. |
| 6,984,426 B2 | 1/2006 | Miksic et al. |
| 6,984,694 B2 | 1/2006 | Blasius, Jr. et al. |
| 7,052,580 B2 | 5/2006 | Trokhan et al. |
| 7,083,697 B2 | 8/2006 | Dao et al. |
| 7,098,292 B2 | 8/2006 | Zhao et al. |
| 7,144,632 B2 | 12/2006 | Hayes |
| 7,160,977 B2 | 1/2007 | Hale et al. |
| 7,160,997 B2 | 1/2007 | Chou et al. |
| 7,166,654 B2 | 1/2007 | Fujita et al. |
| 7,172,814 B2 | 2/2007 | Hodson |
| 7,186,789 B2 | 3/2007 | Hossainy et al. |
| 7,196,157 B2 | 3/2007 | Bastioli et al. |
| 7,208,535 B2 | 4/2007 | Asrar et al. |
| 7,214,414 B2 | 5/2007 | Khemani et al. |
| 7,220,815 B2 | 5/2007 | Hayes |
| 7,225,518 B2 | 6/2007 | Eidenschink et al. |
| 7,241,832 B2 | 7/2007 | Khemani et al. |
| 7,241,838 B2 | 7/2007 | Shelby et al. |
| 7,252,980 B2 | 8/2007 | Walsem et al. |
| 7,284,401 B2 | 10/2007 | Larson et al. |
| 7,297,394 B2 | 11/2007 | Khemani et al. |
| 7,314,480 B2 | 1/2008 | Eidenschink et al. |
| 7,344,034 B2 | 3/2008 | Heinrich et al. |
| 7,354,653 B2 | 4/2008 | Germroth et al. |
| 7,354,656 B2 | 4/2008 | Mohanty et al. |

(56) References Cited

U.S. PATENT DOCUMENTS

| | | |
|---|---|---|
| 7,361,701 B2 | 4/2008 | Takahashi et al. |
| 7,368,503 B2 | 5/2008 | Hale |
| 7,368,511 B2 | 5/2008 | Hale et al. |
| 7,371,799 B2 | 5/2008 | Mather et al. |
| 7,402,170 B2 | 7/2008 | McCullagh et al. |
| 7,459,517 B2 | 12/2008 | Fukui et al. |
| 7,470,290 B2 | 12/2008 | Rodrigues et al. |
| 7,569,273 B2 | 8/2009 | Bredt et al. |
| 7,592,019 B2 | 9/2009 | Drucks et al. |
| 7,597,804 B2 | 10/2009 | Duval et al. |
| 7,619,025 B2 | 11/2009 | Mohanty et al. |
| 7,642,301 B2 | 1/2010 | Uradnisheck |
| 7,683,117 B2 | 3/2010 | Moriyama et al. |
| 7,718,720 B2 | 5/2010 | Padwa |
| 7,731,685 B2 | 6/2010 | Ragheb et al. |
| 7,732,523 B2 | 6/2010 | Morimoto et al. |
| 7,744,619 B2 | 6/2010 | Eidenschink |
| 7,766,956 B2 | 8/2010 | Jang |
| 7,781,539 B2 * | 8/2010 | Whitehouse ............ C08K 5/34 525/450 |
| 7,803,149 B2 | 9/2010 | Bates et al. |
| 7,867,422 B2 | 1/2011 | Nelson et al. |
| 7,884,143 B2 | 2/2011 | Fournier et al. |
| 7,928,167 B2 * | 4/2011 | Whitehouse ............ A47L 13/17 525/450 |
| 7,973,101 B2 | 7/2011 | Aoyama et al. |
| 8,003,719 B2 | 8/2011 | Padwa |
| 8,003,731 B2 | 8/2011 | Seeliger et al. |
| 8,026,301 B2 | 9/2011 | Sumanam |
| 8,202,947 B2 | 6/2012 | Pfaadt et al. |
| 8,283,435 B2 | 10/2012 | Whitehouse |
| 8,487,023 B2 | 7/2013 | Whitehouse et al. |
| 8,680,228 B2 | 3/2014 | Guo et al. |
| 8,822,584 B2 | 9/2014 | Whitehouse |
| 9,034,989 B2 | 5/2015 | Padwa et al. |
| 9,346,948 B2 | 5/2016 | Whitehouse |
| 9,464,187 B2 | 10/2016 | Kann |
| 9,475,930 B2 | 10/2016 | Weinlein et al. |
| 9,505,927 B2 | 11/2016 | Kann |
| 1,003,013 A1 * | 7/2018 | Weinlein et al. |
| 10,030,135 B2 * | 7/2018 | Weinlein ................ C08L 27/06 |
| 2002/0004578 A1 | 1/2002 | Shelby et al. |
| 2002/0028857 A1 | 3/2002 | Holy |
| 2002/0042481 A1 | 4/2002 | Marchessault et al. |
| 2002/0043737 A1 | 4/2002 | Zhong et al. |
| 2002/0058316 A1 | 5/2002 | Horowitz |
| 2002/0068810 A1 | 6/2002 | Whitehouse et al. |
| 2002/0077269 A1 | 6/2002 | Whitehouse et al. |
| 2002/0143116 A1 | 10/2002 | Noda et al. |
| 2002/0143136 A1 | 10/2002 | Noda et al. |
| 2002/0156128 A1 | 10/2002 | Williams et al. |
| 2003/0082148 A1 | 5/2003 | Ludwig et al. |
| 2003/0143116 A1 | 7/2003 | Zheng et al. |
| 2003/0187149 A1 | 10/2003 | Schmidt et al. |
| 2004/0063824 A1 | 4/2004 | Takagi et al. |
| 2004/0092672 A1 | 5/2004 | Bastioli et al. |
| 2004/0094474 A1 | 5/2004 | Heinrich et al. |
| 2004/0103705 A1 | 6/2004 | Maria Langezaal |
| 2004/0106985 A1 | 6/2004 | Jang |
| 2004/0171757 A1 | 9/2004 | Moens et al. |
| 2004/0213941 A1 | 10/2004 | Whitehouse |
| 2004/0214927 A1 | 10/2004 | Nitzsche |
| 2004/0220355 A1 | 11/2004 | Whitehouse |
| 2005/0043680 A1 | 2/2005 | Segal et al. |
| 2005/0043786 A1 | 2/2005 | Chu et al. |
| 2005/0060028 A1 | 3/2005 | Horres et al. |
| 2005/0069571 A1 | 3/2005 | Slivka et al. |
| 2005/0079200 A1 | 4/2005 | Rathenow et al. |
| 2005/0101713 A1 | 5/2005 | Lake et al. |
| 2005/0107505 A1 | 5/2005 | Shinoda et al. |
| 2005/0137304 A1 | 6/2005 | Strand et al. |
| 2005/0154442 A1 | 7/2005 | Eidenschink et al. |
| 2005/0182473 A1 | 8/2005 | Eidenschink et al. |
| 2005/0209374 A1 | 9/2005 | Matosky et al. |
| 2005/0209377 A1 | 9/2005 | Padwa |
| 2005/0260723 A1 | 11/2005 | Yu |
| 2005/0278021 A1 | 12/2005 | Bates et al. |
| 2006/0032633 A1 | 2/2006 | Nguyen |
| 2006/0036012 A1 | 2/2006 | Hayes et al. |
| 2006/0036281 A1 | 2/2006 | Patterson et al. |
| 2006/0073346 A1 | 4/2006 | Super et al. |
| 2006/0110464 A1 | 5/2006 | Walls et al. |
| 2006/0115515 A1 | 6/2006 | Pirhonen et al. |
| 2006/0147412 A1 | 7/2006 | Hossainy et al. |
| 2006/0159918 A1 | 7/2006 | Dugan et al. |
| 2006/0247390 A1 | 11/2006 | Whitehouse et al. |
| 2007/0021515 A1 | 1/2007 | Glenn et al. |
| 2007/0021534 A1 | 1/2007 | Glenn et al. |
| 2007/0027247 A1 | 2/2007 | Ueda et al. |
| 2007/0042207 A1 | 2/2007 | Berger et al. |
| 2007/0079945 A1 | 4/2007 | Noda et al. |
| 2007/0088099 A1 | 4/2007 | Mentink et al. |
| 2007/0166317 A1 | 7/2007 | Halbert |
| 2007/0182041 A1 | 8/2007 | Rizk et al. |
| 2007/0203283 A1 | 8/2007 | Scheer |
| 2007/0213466 A1 | 9/2007 | Uradnisheck |
| 2007/0228046 A1 | 10/2007 | Bastioli et al. |
| 2008/0071008 A1 | 3/2008 | Smillie et al. |
| 2008/0071018 A1 | 3/2008 | Smillie et al. |
| 2008/0146686 A1 | 6/2008 | Handa |
| 2008/0281018 A1 | 11/2008 | Seeliger et al. |
| 2008/0311813 A1 | 12/2008 | Ting et al. |
| 2008/0315453 A1 | 12/2008 | Molitor et al. |
| 2009/0018235 A1 | 1/2009 | Nascimento et al. |
| 2009/0076191 A1 | 3/2009 | Aoyama et al. |
| 2009/0137057 A1 | 5/2009 | Fraser et al. |
| 2009/0162683 A1 | 6/2009 | Douard |
| 2009/0215914 A1 | 8/2009 | Hirose et al. |
| 2009/0221732 A1 | 9/2009 | Wernett |
| 2009/0270280 A1 | 10/2009 | Zhang et al. |
| 2009/0274885 A1 | 11/2009 | Egawa |
| 2009/0312480 A1 | 12/2009 | Kohama |
| 2010/0015544 A1 | 1/2010 | Agur et al. |
| 2010/0041835 A1 | 2/2010 | Scherzer et al. |
| 2010/0048767 A1 | 2/2010 | Nascimento et al. |
| 2010/0089289 A1 | 4/2010 | Mahiat et al. |
| 2010/0120307 A1 | 5/2010 | Noh |
| 2010/0130652 A1 | 5/2010 | Padwa |
| 2011/0124779 A1 | 5/2011 | Whitehouse et al. |
| 2011/0136953 A1 | 6/2011 | Thetford et al. |
| 2011/0183143 A1 | 7/2011 | Tarrit et al. |
| 2011/0193007 A1 | 8/2011 | Avakian |
| 2011/0251349 A1 | 10/2011 | Padwa et al. |
| 2011/0256398 A1 | 10/2011 | Kann et al. |
| 2011/0293865 A1 | 12/2011 | Padwa et al. |
| 2011/0306693 A1 | 12/2011 | Bosnyak et al. |
| 2012/0041109 A1 | 2/2012 | Krishnaswamy |
| 2013/0310473 A1 | 11/2013 | Becker et al. |
| 2014/0051787 A1 | 2/2014 | Kann et al. |
| 2016/0108233 A1 | 4/2016 | Kann et al. |
| 2017/0166740 A1 * | 6/2017 | Weinlein ................ C08L 33/12 |
| 2017/0174878 A1 | 6/2017 | Peoples et al. |

FOREIGN PATENT DOCUMENTS

| | | |
|---|---|---|
| CN | 1772810 A | 5/2006 |
| CN | 1922255 A | 2/2007 |
| CN | 101045810 A | 10/2007 |
| CN | 101120040 A | 2/2008 |
| CN | 101143962 A | 3/2008 |
| CN | 101175818 A | 5/2008 |
| CN | 101516998 A | 8/2009 |
| CN | 101918485 A | 12/2010 |
| CN | 102421819 A | 4/2012 |
| CN | 102532739 A | 7/2012 |
| CN | 102786751 A | 11/2012 |
| CN | 103571105 A | 2/2014 |
| CN | 103665688 A | 3/2014 |
| CN | 20131698580 A | 3/2014 |
| DE | 43 00 420 A1 | 7/1994 |
| DE | 4430415 A1 | 3/1996 |
| DE | 197 50 371 A1 | 5/1999 |
| EP | 0052460 B1 | 2/1985 |
| EP | 0300480 A2 | 1/1989 |

(56) References Cited

FOREIGN PATENT DOCUMENTS

| | | |
|---|---|---|
| EP | 0435 435 A2 | 7/1991 |
| EP | 0 450 777 A2 | 10/1991 |
| EP | 0494405 A2 | 7/1992 |
| EP | 0501641 A1 | 9/1992 |
| EP | 0 553 394 A1 | 8/1993 |
| EP | 0572110 A2 | 12/1993 |
| EP | 0 609 713 A1 | 8/1994 |
| EP | 0 741 177 A2 | 11/1996 |
| EP | 0 826 803 A2 | 3/1998 |
| EP | 0 890 614 A1 | 1/1999 |
| EP | 0 989 159 A1 | 3/2000 |
| EP | 1 000 963 A1 | 5/2000 |
| EP | 1 193 294 A2 | 4/2002 |
| EP | 1 236 753 A1 | 9/2002 |
| EP | 1445282 A1 | 8/2004 |
| EP | 1 520 880 A2 | 4/2005 |
| EP | 1593705 A1 | 11/2005 |
| EP | 1 642 926 A1 | 4/2006 |
| EP | 1 657 280 A1 | 5/2006 |
| EP | 1 867 677 A1 | 12/2007 |
| EP | 1 870 432 A1 | 12/2007 |
| EP | 1881036 A1 | 1/2008 |
| EP | 1911809 A1 | 4/2008 |
| EP | 1950053 A1 | 7/2008 |
| FR | 2656620 A1 | 7/1991 |
| GB | 2 136 003 A | 9/1984 |
| GB | 2 442 333 A | 4/2008 |
| JP | 57030776 | 2/1982 |
| JP | 58-046277 | 10/1983 |
| JP | H07-285197 A | 10/1995 |
| JP | 2011-302521 | 11/1999 |
| JP | 2001-286820 A | 10/2001 |
| JP | 2001-302897 A | 10/2001 |
| JP | 2001-316658 A | 11/2001 |
| JP | 2002-532618 A | 10/2002 |
| JP | 2003092926 A | 4/2003 |
| JP | 2003-192884 A | 7/2003 |
| JP | 2004-512419 A | 4/2004 |
| JP | 2004-190025 A | 7/2004 |
| JP | 2004-190026 A | 7/2004 |
| JP | 2007077232 A | 3/2007 |
| JP | 2007-130763 A | 5/2007 |
| WO | WO-94/10257 A1 | 5/1994 |
| WO | WO-94/21743 A1 | 9/1994 |
| WO | WO-1994/028070 A1 | 12/1994 |
| WO | WO-95/02649 A1 | 1/1995 |
| WO | WO-95/10577 A1 | 4/1995 |
| WO | WO-95/20615 A1 | 8/1995 |
| WO | WO-96/05264 A1 | 2/1996 |
| WO | WO-96/08535 A1 | 3/1996 |
| WO | WO-96/09402 A1 | 3/1996 |
| WO | WO-97/04036 A1 | 2/1997 |
| WO | WO-9707153 A1 | 2/1997 |
| WO | WO-98/46782 A1 | 10/1998 |
| WO | WO-1999/14268 A1 | 3/1999 |
| WO | WO-99/023146 A1 | 5/1999 |
| WO | WO-99/23161 A2 | 5/1999 |
| WO | WO-99/46331 A1 | 9/1999 |
| WO | WO-00/37119 A1 | 6/2000 |
| WO | WO-00/53669 A1 | 9/2000 |
| WO | WO-01/15671 A2 | 3/2001 |
| WO | WO-2001/68890 A2 | 9/2001 |
| WO | WO-02/10303 A2 | 2/2002 |
| WO | WO-02/28969 A2 | 4/2002 |
| WO | WO-2002/34857 A2 | 5/2002 |
| WO | WO-02/50156 A2 | 6/2002 |
| WO | WO-02/059201 A1 | 8/2002 |
| WO | WO-02/077080 A1 | 10/2002 |
| WO | WO-02/085983 A1 | 10/2002 |
| WO | WO-02/090314 A1 | 11/2002 |
| WO | WO-02/094759 A1 | 11/2002 |
| WO | WO-2004/076582 A1 | 9/2004 |
| WO | WO-2004/076583 A1 | 9/2004 |
| WO | WO-05/025570 A1 | 3/2005 |
| WO | WO-2005/066256 A1 | 7/2005 |
| WO | WO-2006/087346 A1 | 8/2006 |
| WO | WO-2007/099056 A1 | 9/2007 |
| WO | WO-2008/027046 A1 | 3/2008 |
| WO | WO-2008/036334 A2 | 3/2008 |
| WO | WO-2008/065571 A1 | 6/2008 |
| WO | WO-2008/073401 A1 | 6/2008 |
| WO | WO-2008/079262 A2 | 7/2008 |
| WO | WO-2008/098888 A2 | 8/2008 |
| WO | WO-2008/098889 A1 | 8/2008 |
| WO | WO-2008/130225 A2 | 10/2008 |
| WO | WO-2008/138225 A1 | 11/2008 |
| WO | WO-2009/032864 A1 | 3/2009 |
| WO | WO-2009/077860 A2 | 6/2009 |
| WO | WO-2009/129499 A1 | 10/2009 |
| WO | WO-2009/137058 A1 | 11/2009 |
| WO | WO-2010/008445 A2 | 1/2010 |
| WO | WO-2010/008447 A1 | 1/2010 |
| WO | WO-2010/014630 A2 | 2/2010 |
| WO | WO-2010/043648 A1 | 4/2010 |
| WO | WO-2010/065053 A1 | 6/2010 |
| WO | WO-2010/075530 A1 | 7/2010 |
| WO | WO-2010/108076 A2 | 9/2010 |
| WO | WO-2010/118041 A1 | 10/2010 |
| WO | WO-2010/133560 A1 | 11/2010 |
| WO | WO-2011/031558 A2 | 3/2011 |
| WO | WO-2014017715 A1 | 1/2014 |
| WO | WO-2014/028943 A1 | 2/2014 |
| WO | WO-2014/194220 A1 | 12/2014 |
| WO | WO-2015/149029 A1 | 10/2015 |

OTHER PUBLICATIONS

Final Office Action for U.S. Appl. No. 12/991,404, "Biodegradable Polyester Blends," dated Mar. 19, 2013.
Final Office Action for U.S. Appl. No. 10/783,958 dated Apr. 28, 2008.
Final Office Action issued for U.S. Appl. No. 10/783,958 dated Apr. 7, 2006.
Final Office Action issued for U.S. Appl. No. 10/783,995 dated Jul. 12, 2007.
Final Office Action issued for U.S. Appl. No. 10/783,995 dated Oct. 30, 2008.
Final Office Action issued in U.S. Appl. No. 10/783,958 dated Dec. 1, 2010.
Final Office Action issued in U.S. Appl. No. 10/783,995 dated Apr. 5, 2006.
Final Office Action issued in U.S. Appl. No. 11/022,954 dated Dec. 23, 2008.
Final Office Action issued in U.S. Appl. No. 12/695,411 dated Apr. 11, 2012.
Non-Final Office Action dated Jan. 22, 2013, U.S. Appl. No. 13/000,959.
Non-Final Office Action for U.S. Appl. No. 12/988,175, "Nucleating Agents for Polyhydroxyalkanoates," dated Jul. 3, 2012.
Non-Final Office Action for U.S. Appl. No. 13/391,894, "Toughened Polyhydroxyalkanoate Compositions," dated Apr. 4, 2015.
Non-Final Office Action for U.S. Appl. No. 14/422,135, "Biobased Rubber Modifiers for Polymer Blends," dated Sep. 3, 2015.
Non-final Office Action for U.S. Appl. No. 10/783,958 dated Aug. 8, 2007.
Non-final Office Action for U.S. Appl. No. 10/783,958 dated Feb. 3, 2009.
Non-final Office Action for U.S. Appl. No. 10/783,958 dated Mar. 12, 2010.
Non-final Office Action for U.S. Appl. No. 10/783,958 dated Nov. 28, 2006.
Non-final Office Action for U.S. Appl. No. 10/783,995 dated Jul. 14, 2009.
Non-final Office Action issued for U.S. Appl. No. 10/783,958 dated Sep. 1, 2005.
Non-final Office Action issued for U.S. Appl. No. 10/783,995 dated Jan. 10, 2008.
Non-final Office Action issued for U.S. Appl. No. 10/783,995 dated Jan. 3, 2007.

(56) References Cited

OTHER PUBLICATIONS

Non-final Office Action issued in U.S. Appl. No. 11/772,574 dated Jun. 12, 2009.
Non-final Office Action issued in U.S. Appl. No. 12/695,411 dated Oct. 21, 2011.
Non-final Office Action issued in U.S. Appl. No. 12/851,213 dated Sep. 21, 2010.
Non-final Office Action issued in U.S. Appl. No. 10/783,958 dated Mar. 12, 2010.
Non-final Office Action issued in U.S. Appl. No. 10/783,995 dated Aug. 24, 2005.
Non-final Office Action issued in U.S. Appl. No. 11/022,954 dated Apr. 25, 2008.
Non-Final Rejection for U.S. Appl. No. 12/991,404, "Biodegradable Polyester Blends," dated Nov. 12, 2012.
Non-Final Rejection for U.S. Appl. No. 13/001,019, "Branched PHA Compositions, Methods for Their Production, and Use in Applications," dated Mar. 3, 2014.
Notice of Allowance for U.S. Appl. No. 13/391,894, "Toughened Polyhydroxyalkanoate Compositions," dated Jan. 20, 2016.
Notice of Allowance for U.S. Appl. No. 12/991,404, "Biodegradable Polyester Blends," dated Apr. 28, 2014.
Notice of Allowance for U.S. Appl. No. 12/991,404, "Nucleating Agents for Polyhydroxyalkanoates," dated Mar. 18, 2013.
Notice of Allowance for U.S. Appl. No. 13/001,019, "Branched PHA Compositions, Methods for Their Production, and Use in Applications," dated Jan. 13, 2015.
Notice of Allowance for U.S. Appl. No. 14/094,150, "Biobased Modifiers for Polyvinylchloride Blends," dated Jun. 10, 2016.
Notice of Allowance for U.S. Appl. No. 14/422,135, "Biobased Rubber Modifiers for Polymer Blends," dated Jun. 14, 2016.
Notice of Allowance for U.S. Appl. No. 11/022,954 dated Sep. 25, 2009.
Notice of Allowance issued in U.S. Appl. No. 11/772,574 dated Dec. 23, 2009.
Notice of Allowance issued in U.S. Appl. No. 10/783,995 dated Apr. 14, 2010.
Notice of Allowance issued in U.S. Appl. No. 12/851,213 dated Dec. 22, 2010.
Notice of Allowance issued in U.S. Appl. No. 13/077,580 dated May 19, 2011.
Requirement for Restriction for U.S. Appl. No. 13/391,894, "Toughened Polyhydroxyalkanoate Compositions," dated Sep. 8, 2014.
Requirement for Restriction for U.S. Appl. No. 13/132,57, "Production of Polyhydroxyalkanoate Foam," dated Jan. 29, 2013.
Abe et al., "Synthesis and Characterization of Poly[(R,S)-3-hydroxybutyrate-b-6-hydroxyhexanoate] as a Compatibilizer for a Biodegradabl Blend of Poly[(R)-3-hydroxybutyrate] and Poly(6-hydroxyhexanoate)", Macromolecules, 27(21):6012-6017 (1994).
Avella et al., "Poly(3-hydroxybutyrate)/poly(methyleneoxide) blends: thermal, crystallization and mechanical behaviour", Polymer, vol. 38, No. 25, pp. 6135-6143 (1997).
Bliimm et al., "Miscibility, crystallization and melting of poly(3-hydroxybutyrate)/poly(L-lactide) blends", Polymer, vol. 36, No. 21, pp. 4077-4081 (1995).
Chen et al., "Miscibility and morphology of blends of poly(3-hydroxybutyrate) and poly(vinyl butyral)", Polymer, vol. 42, pp. 8407-8414 (2001).
Chiu et al., "Crystallization induced microstructure of crystalline/crystalline poly(vinylidenefluoride)/poly(3-hydroxybutyrate) blends probed by small angle X-ray scattering", Polymer, vol. 42, pp. 5749-5754 (2001).
Choe et al., "Miscibility of poly(3-hydroxybutyrate-co-3hydroxyvalerate) and poly(vinyl chloride) blends", Polymer, vol. 36, No. 26, pp. 4977-4982 (1995).
Chun et al., "Thermal properties of poly(hydroxybutyrate-co-hydroxyvalerate) and poly(e-caprolactone) blends", Polymer, vol. 41, pp. 2305-2308 (2000).

Class et al., "The Viscoelastic Properties of Rubber-Resin Blends. I. The Effect of Resin Structure", J. Appl. Poly Sci., vol. 30, No. 2, pp. 805-814 (1985).
Class et al., "The Viscoelastic Properties of Rubber-Resin Blends. II. The Effect of Resin Molecular Weight", J. Appl. Poly Sci., vol. 30, No. 2, pp. 815-824 (1985).
Class et al., "The Viscoelastic Properties of Rubber-Resin Blends. III. The Effect of Resin Concentration", J. Appl. Poly Sci., vol. 30, No. 2, pp. 825-842 (1985).
Communication pursuant to Article 94(3) EPC for European Application No. 09743045.8. dated Oct. 11, 2011.
Cox, M.K, "Recycling Biopol—Composting and Material Recycling," Pure Appl. Chem., 32(4):607-612 (1995).
D'Haene et al., "Preparation and Characterization of a Branched Bacterial Polyester", Macromolecules, ACS 32(16): 5229-5235 (1999).
Dr. Chris Schwier, Metabolix, Inc., "Polyhydroxyalkanoates (PHA) Bioplastic Packaging Materials," SERDP Project WP-1478: Dated May 2010.
EP Communication for EP Patent Application No. 04713309.5 dated Nov. 24, 2005.
EP Communication for EP Patent Application No. 04713313.7 dated Nov. 29, 2005.
EP Communication for EP Patent Application No. 04713313.7 dated Jul. 28, 2006.
EP Communication issued in EP Patent Application No. 07076074.9 and dated Dec. 16, 2010.
EP Communication issued in European Patent Application No. 07076074.9 dated Jul. 15, 2009.
EP Search Report for EP Patent Application No. 07076074.9 dated May 13, 2008.
EP Search Report for EP Patent Application No. 08009261.2 dated Aug. 4, 2008.
European Communication issued in European Patent Application No. 07 076 074.9 and dated Sep. 1, 2011.
Examination Report issued in European Application No. 08009261.2 and dated Sep. 24, 2010.
Examiner's Report issued in European Patent Application No. 07 076 074.9 and dated Jun. 4, 2010.
Extended Search Report issued in European Patent Application No. 10007910.2 and dated Feb. 20, 2012.
Fujita et al., "Effects of Miscibility on Peel Strength of Natural-Rubber-Based Pressure-Sensitive Adhesives", J. Appl. Poly Sci., vol. 70, No. 4, pp. 777-784 (1998).
Fujita et al., "Effects of Miscibility on Probe Tack of Natural-Rubber-Based Pressure-Sensitive Adhesives", J. Appl. Poly Sci., vol. 70, No. 4, pp. 771-776 (1998).
Fujita et al., "Miscibility Between Natural Rubber and Tackifiers. I. Phase Diagrams of the Blends of Natural Rubber with Rosin and Terpene Resins", J. Appl. Poly Sci., vol. 64, No. 11, pp. 2191-2197 (1997).
Goh et al., "A completely miscible ternary blend system of poly(3-hydroxybutyrate), poly(ethylene oxide) and polyepichlorohydrin", Polymer, vol. 40, pp. 5733-5735 (1999).
Groeninckx, H. et al., "Crystallization of Poly(ethylene Terephthalate) Induced by Inorganic Compounds. I. Crystallization Behavior from the Glassy State in a Low-Temperature Region," Journal of Polymer Science: Polymer Physics Edition, vol. 12: 303-316 (1974). (4354.1019-002).
Gu-Su Jang et al., "Crystallization Behavior of Polypropylene with or without Sodium Benzoate as a Nucleating Agent," Journal of Polymer Science: Part B: Polymer Physics, vol. 39: 1001-1016 (2001). (4354.1019-002).
Hay et al., "Crystallisation of poly(3-hydroxybutyrate)/polyvinyl acetate blends", Polymer, vol. 41, pp. 5749-5757 (2000).
Hideki, A., et al., "Synthesis and Characterization of Poly[(R,S)-3-hydroxybutyrate-b-6-hydroxyhexanoate] as a Compatibilizer for a Biodegradable Blend of Poly[(R)-3-hydroxybutyrate] and Poly(6-hydroxyhexanoate)," Macromolecules, vol. 27, No. 21: 6012-6017 (1994).
Hobbs et al., "The effect of water on the crystallization of thin films of poly(hydroxybutyrate)", Polymer, vol. 38, No. 15, pp. 3879-3883 (1997).

(56) References Cited

OTHER PUBLICATIONS

International Preliminary Report on Patentability for PCT/US2014/040278, dated Dec. 1, 2015.
International Preliminary Report on Patentability for International Application No. PCT/US2010/030111, dated Oct. 20, 2011.
International Preliminary Report on Patentability for International Application No. PCT/US2015/023186 dated Sep. 27, 2016.
International Preliminary Report on Patentability for International Application No. PCT/US2010/047014; dated Mar. 8, 2012.
International Preliminary Report on Patentability for PCT/US2004/004991 dated Jan. 14, 2005.
International Preliminary Report on Patentability for PCT/US2004/043660 dated Jul. 3, 2006.
International Preliminary Report on Patentability for PCT/US2009/002808. dated Nov. 18, 2010.
International Preliminary Report on Patentability for PCT/US2009/003669, dated Jun. 7, 2011.
International Preliminary Report on Patentability for PCT/US2009/003675. dated Jan. 13, 2011.
International Preliminary Report on Patentability for PCT/US2009/003687; dated Jan. 13, 2011.
International Preliminary Report on Patentability for PCT/US2009/041023, dated Oct. 19, 2010.
International Preliminary Report on Patentability for PCT/US2009/069444, dated Jun. 29, 2011.
International Preliminary Report on Patentability, Application No. PCT/US 2013/055624 filed Aug. 19, 2013, entitled "Biobased Rubber Modifiers for Polymer Blends", dated Feb. 26, 2015.
International Search Report and the Written Opinion of the International Searching Authority, or the Declaration for International Application No. PCT/US2009/069444. dated Jan. 6, 2010.
International Search Report and the Written Opinion of the International Searching Authority, or the Declaration for PCT/US2009/003669. dated Jan. 21, 2010.
International Search Report and Written Opinion for International Application No. PCT/US2015/023186 dated Jul. 1, 2015.
International Search Report and Written Opinion for PCT/US2004/004991 dated Jul. 15, 2004.
International Search Report and Written Opinion for PCT/US2004/004992 dated Jul. 19, 2004.
International Search Report and Written Opinion issued in International Application No. PCT/US2013/055624, "Biobased Rubber Modifiers for Polymer Blends," dated Nov. 6, 2013.
International Search Report for PCT/US2014/040278, dated Dec. 4, 2014.
International Search Report for Int'l Application No. PCT/US2010/030111. dated Jun. 25, 2010.
International Search Report for International Application No. PCT/US/2009/041023, dated Jun. 24, 2009.
International Search Report for International Application No. PCT/US2010/047014, dated May 13, 2011.
International Search Report for PCT/US2004/043660 dated Dec. 15, 2005.
International Search report for PCT/US2009/002808 dated Jul. 20, 2009.
International Search report for PCT/US2009/003675 dated Jan. 20, 2010.
International Search report for PCT/US2009/003687 dated Nov. 2, 2009.
Iriondo et al., "Thermal and infra-red spectroscopic investigations of a miscible blend composed of poly(vinyl phenol) and poly(hydroxybutyrate)", Polymer, vol. 36, No. 16, pp. 3235-3237 (1995).
Iwata, "Role of entanglement in crystalline polymers 1. Basic theory", Polymer, vol. 43, pp. 6609-6626 (2002).
Kim et al., "Miscibility and Pee Strength of Acrylic Pressure-Sensitive Adhesives: Acrylic Copolymer-Tackifier Resin Systems", J. Appl. Poly Sci., vol. 56, No. 2, pp. 201-209 (1995).

Kleinman W A et al.: "Status of gluthathione and other thiols and disulfides in human plasma." Biochemical Pharmacology. Jul. 1, 2000, vol. 60, No. 1, Jul. 1, 2000, pp. 19-29.
Iannace et al., "Poly(3-hydroxybutyrate)-co-(3-hydroxyvalerate)/Poly-L-Lactide Blends: Thermal and Mechanical Properties" *Journal of Applied Polymer Science*, 54:1525-1535 (1994).
Lotti, N., et al, "Binary blends of microbial poly (3-hydroxybutyrate) with polymethacrylates," *Polymer*, 34(23): 4935-4940 (1993).
Luo et al., The effect of molecular weight on the lamellar structure, thermal and mechanical properties of poly(hydroxybutyrate-co-hydroxyvalerates), Polymer, vol. 43, pp. 4159-4166 (2002).
Maekawa et al., "Miscibility and tensile properties of poly ((3-hydroxybutyrate)-cellulose propionate blends", Polymer, vol. 40, pp. 1501-1505 (1999).
Mallarde et al., "Hydrolytic Degradability of poly(3-hydroxyoctanoate) and of a poly(3-hydroxyoctanoate)/poly(R,S-lactic acid) Blend", Polymer, 39(15):3387-3392 (1998).
Martin D P et al: "Medical applications of poly-4-hydroxybutyrate: A strong flexible absorbable biomaterial", Biochemical Engineering Journal, Elsevier, Amsterdam, NL, vol. 16, No. 2, 1, pp. 97-105, (2003).
McNally et al., "Polyamide-12 layered silicate nanocomposites by melt blending", Polymer, vol. 44, pp. 2761-2772 (2003).
Miguel et al., "Blends of bacterial poly(3-hydroxybutyrate) with synthetic poly(3-hydroxybutyrate) and poly(epichlorohydrin): transport properties of carbon dioxide and water vapour", Polymer, vol. 42, pp. 953-962 (2001).
Mizumachi et al., "Theory of Tack of Pressure-Sensitive Adhesive. II", J. Appl. Poly Sci., vol. 37, No. 11, pp. 3097-3104 (1989).
Na, Y.H, et al. "Phase-separation enhanced enzymatic degradation of atactic poly (R,S-3-hydroxybutyrate) in the blends with poly(methyl methacrylate)," *Polymer Degradation and Stability*, 79:535-545 (2003).
Nakajima et al., Rheology, Composition, and Peel-Mechanism of Block Copolymer-Tackifier-Based Pressure Sensitive Adhesives, J. Appl. Poly Sci., vol. 44, No. 8, pp. 1437-1456 (1992).
Natureworks, "Technology Focus Report: Polylactic Acid Containing Fillers and Fibers," Internet Citation, pp. 1-5, Sep. 19, 2007. (Retrieved from the Internet: URL:http://www.natureworks11c.com/product-and-applications/ingeo-biopolymer/technical-publications/l/media/Files/Fillers-and Fibers-Technology).
Ohkoshi et al., Miscibility and solid-state structures for blends of poly[(S.)-lactide] with atactic polyKR,S)-3-hydroxybutyrater, Polymer, vol. 41, pp. 5985-5992 (2000).
Paul et al., "New nanocomposite materials based on plasticized poly(L-lactide) and organo-modified montmorillonites: thermal and morphological study", Polymer, vol. 44, pp. 443-450 (2003).
Purdie J. W., "Gamma-Radiolysis of Cysteine-Cysteamine Disulfide in Aqueous solution" Canadian J. of Chemistry, vol. 49, 1971, pp. 725-730.
Qiu et al., "Melting behaviour of poly(butylenes succinate) in miscible blends with poly(ethylene oxide)", Polymer, vol. 44, pp. 3095-3099 (2003).
Qiu et al., "Miscibility and crystallization of poly(ethylene oxide) and poly(e-caprolactone) blends", Polymer, vol. 44, pp. 3101-3106 (2003).
Qiu et al., "Poly (hydroxybutyrate)/poly(butylenes succinate) blends: miscibility and nonisothermal crystallization", Polymer, vol. 44, pp. 2503-2508 (2003).
Saito et al., Microbial Synthesis and Properties of Poly(3-hydroxybutyrate-co-4-hydroxybutyrate), Polymer International, 39 (1996) pp. 169-174.
Salamone J., ed., Polymeric Materials Encyclopedia, vol. 6, p. 4307, 1996.
Sato S. et al.: "Indentification of thioether intermediates in the reductive transformation of gonyautoxins into saxitoxins by thiols." Bioorganic & Medicinal Chemistry Letters. Aug. 21, 2000, vol. 10, No. 16, pp. 1787-1789.
Scandola et al., "Polymer Blends of Natural Poly(3-hydroxybutyrate-co-3-hydroxyvalerate) and a Synthetic Atactic Poly(3-hydroxybutyrate). Characterization and Biodegradation Studies.", Macromolecules, 30(9):2568-2574 (1997).

(56) References Cited

OTHER PUBLICATIONS

Siciliano et al., "Miscibility and Thermal and Crystallization Behaviors of Pold(D-(--)-3-hydroxybutyrate/Atactic Poly(methyl methacrylate) Blends," Macromolecules, 28: 8065-8072 (1995).
Supplementary European Search Report for EP Patent Application No. 04815630.1 dated Jan. 22, 2007.
Supplementary European Search Report on International Application No. 10815895.7; dated Feb. 21, 2013.
Tsuji et al., "Blends of Crystalline and Amorphous Poly(lactide) III. Hydrolysis of Solution-cast Blend Films", *Journal of Applied Polymer Science*, 64(7):855-863 (1997).
Whitehouse R. S. "Contact Adhesives", Critical Reports on Applied Chemistry, Synthetic Adhesives & Sealants, Chapter 1, vol. 16, edited by WC Wake (1987).
Wiebking, "Increasing the Flexural Modulus of Rigid PVC at Elevated Temperatures," J Vinyl Addit Techn, 12: 37-40 (2006).
Willett et al., "Processing and properties of extruded starch/polymer foams", Polymer, vol. 43, pp. 5935-5947 (2002).
Written Opinion of the International Searching Authority for PCT/US2009/002808. dated Nov. 6, 2010.
Xia, Z, et al., "The Reinforcement of Poly (lactic acid) Using High Aspect Ratio Calcium Carbonate Based Mineral Additive," *Plastic Encounter at Antec 2007*, vol. 3, pp. 1549-1553, Jan. 1, 2007.

Xu et al., "In situ FT1R study on melting and crystallization of polyhydroxyalkanoates", Polymer, vol. 43, pp. 6893-6899 (2002).
Yoon et al., "Compatibility of poly(3-hydroxybutyrate)/poly(ethylene-co-vinyl acetate) blends", Polymer, vol. 39, No. 12, pp. 2479-2487 (1998).
Yoshie et al., Temperature dependence of cocrystallization and phase segregation in blends of poly(3-hydroxybutyrate) and poly(3-hydroxybutyrate-co-3-hydroxyvalerate), Polymer, vol. 42, pp. 8557-8563 (2001).
Yuan et al., "Miscibility and transesterification of phenoxy with biodegradable poly(3-hydroxybutyrate)", Polymer, vol. 39., vol. 10, pp. 1893-1897 (1998).
Zhang et al., "Miscibility, melting and crystallization behavior of two bacterial polyester/poly(epichlorohydrin-co-ethylene oxide) blend systems", Polymer, vol. 41, pp. 1429-1439 (2000).
Final Office Action for U.S. Appl. No. 15/129,345 dated Aug. 3, 2018.
Non-Final Rejection for U.S. Appl. No. 15/129,345 dated Dec. 12, 2017.
Garcia-Quesada et al., "Processability of PVC Plastisols Containing a Polyhydroxybutyrate-Polyhydroxyvalerate Copolymer," Journal of Vinyl and Additive Technology, 18(1): 9-16 (2012).

\* cited by examiner

RECYCLATE BLENDS

RELATED APPLICATIONS

This application is the U.S. National Stage of International Application No. PCT/US2014/040278, filed May 30, 2014, which designates the U.S., published in English, and claims the benefit of U.S. Provisional Application No. 61/828,845, filed on May 30, 2013, 61/844,911, filed Jul. 11, 2013, 61/889,833, filed Oct. 11, 2013 and 61/900,540, filed Nov. 6, 2013. The entire teachings of the above applications are incorporated herein by reference.

BACKGROUND OF THE INVENTION

Plastics have become an indispensable part of modern life. Their versatility in terms of physical properties, formability and cost has made plastics the material of choice for many product applications. The vast majority of plastics materials are made from depleting petroleum fossil resources providing a strong driver to not only reduce their consumption but to extend the use of these materials by recycling. Plastics have also become a symbol of disposability and hence an inevitable object of concern given heightened public awareness of environmental issues providing strong drivers to recycle or re-use post-consumer plastic materials and avoid disposing of them in landfills or the environment. During the melt processing of plastics, it is inevitable that a certain percentage of the material will not be directly converted into usable end product. Scrap material can be generated during processing equipment startup (purge material), operation (sprues, flash, runners and product rejects) and shutdown. For some plastics however generated scrap material can be recycled directly back into the melt process aiding both the economics and environmental impact of the overall product manufacturing process. Prior to recycling of the material, it is typically ground (termed regrind), chopped or crushed to a uniform and specific particle size and in some cases it is necessary to mix it with unprocessed or virgin plastic material to make a useful product formulation or compound. It is also desirable to be able to use or recycle the plastic from products after their useful lifetime using the same approach of grinding up the used plastic products to make a regrind material and combining that with virgin material as needed in an extruder to re-process it into new products.

Polyvinylchloride (PVC) is one of the most important commodity plastics and is used in a very wide range of applications form rigid to flexible applications. In order to deliver PVC products to this wide array of end uses it is one of the most highly formulated plastics in use and a PVC part can contain up to 50% or more of other materials. These other materials can be collectively referred to as additives and include everything from mineral fillers, plasticizers, processing aids, UV stabilizers oxidative stabilizers etc. PVC has the disadvantage of having relatively low thermal stability and this is further complicated by the high levels of additives used to make PVC broadly useful in applications. Thermal stability in general relates to the process whereby through high temperature, high pressure, oxidation or mechanical stress, the long chains of a polymer begins to break and react with one another thereby changing the properties of the polymer. Since thermoplastic materials are usually formed into products by the application of heat, pressure and/or mechanical stress, degradation can pose a serious problem. It is also well known that the reduction in molecular weight of PVC due to thermal processing can negatively impact many key physical properties such as tensile strength, impact resistance, softening temperature and long term aging, many of which are dependent on maintaining a consistent molecular weight. Chemical reactions that can occur in PVC when it is processed for the first time can result in crosslinking and other reactions which alter the melt rheology and make it more difficult to process the second time around. This manifests itself as increased torque in the extruder which extends processing times and can result in lower physical performance of the parts produced.

To prevent thermal degradation from occurring in polyvinylchlorides, additives such as organotin mercaptides/sulfides or metal carboxylates are usually added. The metal carboxylates are mixtures based on salts of aliphatic (oleic) or aromatic (alkylbenzoic) carboxylic acids usually with combinations of barium/zinc or calcium/zinc metals. These additives improve thermal stability by acting directly at the dehydrochlorination initiation site and/or by reacting with the free HCl generated. In the case of the metal carboxylates, reaction with HCl produces chloride salts which can also have a destabilizing effect on the PVC. Therefore co-stabilizers such as polyols, phosphites and epoxy plasticizers are often used along with the metal carboxylates to improve initial color, transparency and long term PVC stability.

For semi-rigid and flexible polyvinylchlorides, plasticizer's are also a major component of the overall product formulation. It has been found that plasticizer type, concentration and oxidative stability (formation of peroxide radicals) all affect the thermal stability of PVC.

The use of PVC recyclates (plastic material that have been thermally processed at least once) to produce products is therefore limited due to the impairment of physical properties caused by melt processing the first time. To avoid simply wasting PVC and to enable recycling, the PVC recyclates are usually combined with virgin unprocessed PVC resin and the level of recyclate that can be used is typically limited to only 5-25% by weight of the total plastic weight in a product formulation before the physical properties of the final product are too impaired to be useful in the targeted application.

Products made from PVC in many cases have long term use in construction (roofing membranes, doors, window frames, decking, partitions, furniture, floor coverings (carpet, tiles) and the like) and automotive and industrial applications and have very high levels of fillers and additives. It is well known that recycling of PVC is both costly and technically challenging but also very desirable from an environmental and sustainability perspective. The approach of recycling PVC products for energy capture is not a desirable solution because of producing undesirable toxic compounds such as dioxins. One current method being promoted for recycling of PVC involves solvent extraction of the PVC polymer from the collected used parts. The need to develop improved technologies to enable the recycling or re-use of PVC is of growing importance as many of the PVC parts used in construction applications which were introduced 20-30 years ago are now reaching the end of their useful life. It is therefore desirable to be able to take post-consumer use PVC products and recycle them via melt extrusion into new products. Before PVC parts can be re-cycled in a melt extrusion process they have to first be converted into a smaller particles that can be fed into an extruder. This is typically accomplished by grinding up the used parts to make a 'regrind" material. In many cases the percentage of recycled PVC that can be used in a given product formulation will be restricted by the final product physical properties. Reduced property performance of PVC products made using regrind or recylate PVC is well known in the industry to be a major problem.

One method for improving the value of and extending the usable range of recycled plastics (such as recycled PVC) is to mix them with additives which can maintain or improve their overall performance in product formulations. Therefore a need exists to develop functional additives which when added to recycled plastics can enhance their material properties and minimize physical property loss with higher loadings of recyclates.

SUMMARY OF THE INVENTION

Described herein are compositions (e.g., PVC compositions) and polymer compounds (e.g., PVC polymer compounds) comprising a polyester additive(s) which when used in formulations (e.g., PVC formulations) in combination with recycled polymers (e.g. recycled PVC polymers) or recyclate polymers (e.g., recyclate PVC) have improved material properties as compared to those same recycled polymers or recyclate polymers without the inclusion of the polyester additives. When the polyester additive of the present invention is blended with a recyclate polymer, it can enable higher loadings of the recycled polymer with virgin polymer resin in product formulations thereby lowering manufacturing costs and decreasing the environmental impact of polymer waste which would otherwise be disposed of in landfills or burned. The PHA additives generally are produced using renewable starting materials and therefore have a much more positive impact on the environment as compared to petroleum-derived recyclate additives. For example, PVC formulations produced using the polyester additives of the present invention can have higher loadings of recyclate PVC or recycled PVC while still delivering useful material extrusion processing characteristics or final product physical properties than those same PVC formulations without the presence of the polyester additives. In the case of PVC formulations using regrind or recyclate PVC, the polyester additives are typically present at levels of 5-50 weight % of the PVC recyclate or regrind present in the PVC formulation.

As defined herein, the terms "recycled polymer, "recyclate polymer" or "regrind polymer" are used interchangeably and includes post-consumer or industrial use polymer products where it is desirable to recycle the polymer (e.g. PVC) by thermal processing into new products which may be the same product or a lower value product with lower specifications. As defined herein, the term "recyclate polymer also includes regrind, reprocessed, scrap or waste polymer which is produced in a typical extrusion manufacturing situation such as a molding operation where a certain percentage of the input material does not result in finished product but as waste. To minimize the economic impact of this "waste" the recyclate polymer is often fed back into the front end of the manufacturing process as "regrind material". Because the regrind material has been thermally processed once already the physical properties of products made using this material alone, following re-extrusion can be impaired as compared to the same product made using only virgin PVC polymer. When the PVC regrind is combined with virgin PVC polymer, the current industry practice, then the higher the level of regrind PVC polymer added the lower the final product quality and in some cases the slower the rate of the extrusion process which results in a limitation of how much regrind can be recycled in this way. In many cases this limitation is such that some of the re-grind material may have to be disposed of by landfilling which adds cost both from unused material as well as the cost to transport and landfill this waste. It is therefore highly desirable to be able to increase the amount of regrind material that can be used in a manufacturing operation both to improve overall costs but also to reduce the environmental impact of landfilling.

As defined herein "virgin polymer" (e.g., virgin PVC" or "PVC polymer") refers to resins that have not been previously thermally processed into products.

As defined herein polyester additives suitable for practicing the disclosed invention can be aliphatic or aliphatic/aromatic polyesters. Suitable polyester additives can be produced by a number of different polymerization technologies including: biological synthesis inside living cells as is the case for polyhdroxyalkanoate biopolymers or can be produced by traditional chemical synthetic approaches.

The polyhydroxyalkanoate biopolymers preferably contain one or more units of the following formula:

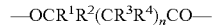
—OCR$^1$R$^2$(CR$^3$R$^4$)$_n$CO— wherein n is 0 or an integer; and wherein R$^1$, R$^2$, R$^3$, and R$^4$ are independently selected from saturated and unsaturated hydrocarbon radicals, and hydrogen atoms.

The polyhydroxyalkanoates are preferably copolymers and in-particular copolymers of 3-hydroxybutyrate (PHB) polymerized with one or more comonomers selected from the group lactic acid (LA), glycolic acid (GA), 2-hydroxybutyrate (2HB), 3-hydroxypropionate (3HP), 4-hydroxybutyrate (4HB), 3-hydroxyvalerate (3HV), 4-hydroxyvalerate (4HV), 5-hydroxyvalerate (5HV), 3-hydroxyhexanoate (3HH), 6-hydroxyhexanoate (6HH) 3-hydroxyoctanoate (3HO) or 3-hydroxydecanoate (3HD). Preferably the distribution of the monomers in the copolymers is random. These materials are collectively referred to as PHB copolymers. Examples of PHB copolymers include poly-3-hydroxybutyrate-co-3-hydroxypropionate (hereinafter referred to as PHB3HP), poly-3-hydroxybutyrate-co-lactic acid (hereinafter referred to as PHBLA) poly-3-hydroxybutyrate-co-4-hydroxybutyrate (hereinafter referred to as P3HB4HB), poly-3-hydroxybutyrate-co-4-hydroxyvalerate (hereinafter referred to as PHB4HV), poly-3-hydroxybutyrate-co-3-hydroxyvalerate (hereinafter referred to as PHB3HV), poly-3-hydroxybutyrate-co-3-hydroxyhexanoate (hereinafter referred to as PHB3HH) and poly-3-hydroxybutyrate-co-5-hydroxyvalerate (hereinafter referred to as PHB5HV) and poly-3-hydroxybutyrate-co-6-hydroxyhexanoate (hereinafter referred to as PHB6HH). Poly-3-hydroxybutyrate-co-3-hydroxyoctanoate (hereinafter referred to as PHB3HO).

As used herein the term "PHA" includes homopolymers of a polyhydroxyalkanoate, copolymers of a polyhydroxyalkanoate, and blends of polyhydroxyalkanoates (e.g., a blend of at least one homopolymer and at least one copolymer, two or more homopolymers, or two or more copolymers).

Other PHAs useful for practicing this invention may contain a range of 3-hydroxymonomers selected from 3HH, 3HO, 3HD etc. and are typically produced by fermentation of vegetable oils or fatty acids. It is well known that the ratio of monomers in the PHA copolymers can be controlled to produce a wide range of physical properties as indicated by a glass transition temperature range from 5° C. to −50° C. and a range of crystallinity from greater than 60% to completely amorphous. The PHA copolymers can be used alone or in blends with different PHAs or other polyesters. With regard to PVC formulations, given that the formulations are used for both flexible applications like for example films, tubing and packaging as well as rigid application such as windows and doors, decking, fencing and the like the level of co-monomer present in the copolymer can be tailored.

The polyester additive of the present invention can also include chemically synthesized aliphatic or aliphatic/aromatic polyesters which can be produced, for example, by ring-opening polymerization of lactones or condensation polymerization of diols and diacids. Suitable lactones include dilactide, beta-propiolactone, beta-butyrolactone, gamma-butyrolactone, gamma-valerolactone, delta-valerolactone, and caprolactone. These lactones can be polymerized individually or in combinations to produce a range of aliphatic polyester copolymers. Examples of other suitable aliphatic polyesters include aliphatic polyesters which can be prepared from diol monomers and one or more diacid monomers. The diacids comprise such monomers as succinic acid, glutaric acid, adipic acid, sebacic acid, azealic acid, or their derivatives, e.g., alkyl esters, acid chlorides, or their anhydrides. The diols comprise such monomers as ethylene glycol, propylene glycol, 1,3-propanediol, 1,4-butanediol, 1,6-hexanediol, or 1,4-cyclohexanedimethanol. In another embodiment, the aliphatic/aromatic polyester comprises various copolyesters of polyethylene terephthalate (PET) or polybutylene terephthalate (PBT) reacted with aliphatic diacids, diols, or hydroxy acids which are incorporated into the polymer backbone to render the copolyesters biodegradable or compostable. In some cases it is useful to use a chemically polymerized aliphatic or aliphatic/aromatic polyester which is biodegradable as defined by ASTM test D6400.

When a polyester additive is blended with recyclate polymer (e.g. recyclate PVC), products made by extrusion of these blends have much improved physical properties and process better (i.e. because of lower torque in the extruder barrel) than when the recyclate polymer is used without the polyester additive. As recyclate polymers are typically combined with virgin polymer in product formulations, the addition of the polyester additive enables higher loadings of the PVC recyclate in a product formulation thereby lowering manufacturing costs and decreasing the environmental impact of polymer waste which would otherwise typically be disposed of in landfills.

Products made with recyclate blends of the present invention (and, particularly, recyclate blends of PVC recyclate and polyester additives including PHA) can exhibit at least one of the following: higher tensile properties, higher tear properties, higher notched Izod impact, better UV, and/or thermal stability as well as increased resistance to fungal growth as compared to the recyclate polymer alone.

In one aspect of the invention, a composition comprising a blend of a recyclate PVC polymer and a polyester additive where the weight percent of the polyester additive in the composition is about 1%, about 2%, about 5% about 10%, about 15%, about 20%, about 30% of the combined weight of the total polymer content of the composition.

In a second aspect the polyester additive is a biologically produced PHA polymer, copolymer or blend thereof.

In a first embodiment of the first aspect, the polyester additive is a PHA including a (PHB) or a poly-3-hydroxybutyrate copolymer where the second monomer comprises one or more monomers selected from the group: lactic acid, glycolic acid, 3-hydroxypropionate (3HP), 4-hydroxybutyrate (4HB), 3-hydroxyvalerate (3HV), 4-hydroxyvalerate (4HV), 5-hydroxyvalerate (5HV), 3-hydroxyhexanoate (3HH), 6-hydroxyhexanoate (6HH) 3-hydroxyoctanoate (3HO) or 3-hydroxydecanoate (3HD). In other words, the polyester additive is a copolymer having a first repeat unit formed from 3-hydroxybutyrate and a second repeat unit formed from glycolic acid, lactic acid, 3-hydroxypropionic acid, 4-hydroxybutyrate, 3-hydroxyvalerate, 4-hydroxyvalerate, 5-hydroxyvalerate, 3-hydroxyhexanoate, 6-hydroxyhexanoate, 3-hydroxyoctanoate, or 3-hydroxydecanoate.

In another embodiment of the first aspect, the polyester additive includes a poly-3-hydroxybutyrate-co-4-hydroxybutyrate (P3HB-4HB) copolymer. In another embodiment of the first aspect, the polyester additive includes a poly-3-hydroxybutyrate-co-3-hydroxyvalerate (P3HB-3HV) copolymer. In another embodiment of the first aspect, the polyester additive includes a poly-3-hydroxybutyrate-co-3-hydroxyhexanoate (P3HB-3HH) copolymer. In a further embodiment of the first aspect, the recyclate polymer comprises recyclate polyvinylchloride, recyclate nylon 6, recyclate POM, or recyclate PMMA.

Recyclate polymers of the present invention include recyclate poly (vinyl chloride) (PVC), recyclate nylon 6, recyclate polyoxymethylene (POM) or recyclate poly(methyl methacrylate).

In a second aspect of the invention, the polyester additive comprises a polyhydroxybutyrate-co-hydroxyvalerate (PHBV) or polyhydroxybutyrate-co-hydroxyhexanoate (PHBH) copolymer. In a first embodiment of the second aspect, the weight percent hydroxyvalerate in the PHBV copolymer is about 2%, about 5%, about 8%, about 10%, about 12% or about 15%. In a second embodiment of the first aspect, the weight percent hydroxyhexanoate is about 2%, about 5%, about 8%, about 11% or about 15%.

In a third aspect of the invention, the polyester additive comprises an aliphatic/aromatic type polyester such as polybutylene-adipate-terephthalate (PBAT) or an aliphatic type polyester such as polycaprolactone, polybutylene-succinate (PBS) or polybutylene-succinate-adipate (PBSA). The recyclate blends of the present invention (e.g., PVC recyclate blends) can be combined with virgin polymer (e.g., virgin PVC) to form product formulations (i.e., formulations from which the products such as films are made); however, the recyclate blends can also be used without virgin polymer (but optionally with other additives) as product formulations. When the recyclate blends (e.g., PVC recyclate blends) are used in product formulations with virgin polymer (e.g., virgin PVC), their content in the product formulation can be 5% or greater, 10% or greater, 15% or greater, 20% or greater, 25% or greater, 30% or greater, 35% or greater, 40% or greater, 45% or greater, 50% or greater, 55% or greater, 60% or greater, 65% or greater, 70% or greater, 75% or greater, 80% or greater, 85% or greater, 90% or greater, 95% by weight of the total product formulation.

A fourth aspect of the invention, is a method of preparing a recyclate blend, e.g., a polyvinyl chloride (PVC) recyclate/polyester additive blend composition, comprising melt blending a recyclate polymer and a polyester additive described herein using a single or twin screw extruder, two-roll mill, Banbury mixer or the like.

The polymer recyclate (e.g., PVC recyclate), polyester additive, or recyclate blend (e.g., PVC recyclate/polyester additive blend) can contain other additives such as plasticizers, branching agents, inert fillers, nucleating agents, thermal stabilizers, co-stabilizers or antioxidants. The polyester additive can be a single homopolymer or copolymer or can contain a blend of various homopolymers and/or copolymers.

The compositions of any of the aspects or embodiments of the invention can be produced as a film, an article (e.g., an article that is used in medical treatments), sheet or multilayer laminate, rigid form such as decking, fencing or window frame. In certain applications, the article has greater tensile elongation with greater tensile toughness than a corresponding polymer article consisting only of recyclate polymer, recyclate polymer plus virgin polymer or filled polymer with no polyester additive added. Polyester additives suitable for practicing the disclosed invention can in some cases be produced using renewable starting materials and thereby have a more positive impact on the environment. It is to be understood that both the foregoing general description and the following detailed description are exemplary and explanatory only and are intended to provide a further explanation of the present invention, as claimed.

DETAILED DESCRIPTION OF THE INVENTION

A description of example embodiments of the invention follows. Polymer blend compositions (also referred to herein as "recyclate blends") of a recyclate polymer (e.g., recyclate PVC) and a polyester additive are described. These recyclate blends which can have improved mechanical, thermal and light stability properties are described (i.e. polymer products formed from these recyclate blends can have improved mechanical, thermal and light stability properties).

One embodiment of the present invention is a composition comprising a recyclate blend of a recyclate polymer and a polyester additive, wherein the recylate polymer is a recyclate poly(vinyl chloride) (PVC), recyclate nylon 6, recyclate polyoxymethylene (POM) or recyclate poly(methyl methacrylate), and the polyester additive comprises a PHA, an aliphatic/aromatic polyester incorporating diols and diacids, a polybutylene-succinate or a polybutylene-succinate-adipate, and combinations thereof.

The compositions of the present invention can be entirely comprised of the recyclate blend, or optionally include further components such as virgin polymer, fillers, or other additives as described herein.

In one aspect of the invention, the composition is a polymer blend of a recyclate polymer and a polyester additive that comprises a PHA. In another aspect of the invention, the polyester additive is an aliphatic polyester or an aliphatic/aromatic polyester. It has been found that adding a polyester additive to a recyclate polymer can improve the mechanical performance and properties of the recyclate polymer (i.e., the recyclate blend is associated with improved mechanical performance compared to the recyclate polymer without addition of polyester additive). This enables addition of the recyclate polymer to virgin polymer at higher loading levels. For example, the polyester additive can improve tensile properties (e.g., toughness, durability, breakability), flexural properties, impact strength and/or tear strength of the recyclate polymer. Further, the additive imparts an expanded process window for the recyclate polymer (e.g., in some circumstances from the miscibility and crystallinity properties of the biodegradable additive). The polyester additive also improves the UV stability (as measured by ASTM G155-2005), promotes improved fungal resistance (as measured by ASTM G21-09) and helps thermally stabilize the recyclate against unwanted crosslinking during reprocessing. It can also help to homogenize the recyclate polymer during processing especially if the recyclate has been collected from different scrap lots and may have varying material properties.

The recyclate polymers include such polymers as flexible, semi-rigid and rigid PVC. All of these are high volume thermoplastic PVC polymer formulations or products that are used in a wide variety of consumer products. In order to lower the cost of manufacturing, material generated during processing of the PVC polymers that does not end up in the product is typically collected and reused by adding it back into the product processing stream. In this way, production costs are kept lower and waste polymer is kept out of the environment.

The polyester additives include both biologically synthesized PHAs and chemically polymerized polyesters. The PHAs themselves include homopolymers copolymers or blended PHAs as defined above. The PHA for combining with the recyclate polymer may be a blend, a copolymer, a mixture or combination of one, two or three or more PHA components. The chemically polymerized polyester additives may be aliphatic polyesters or aliphatic/aromatic polyesters. Aliphatic polyesters include polymers having diol and diacid monomers wherein the diacids comprise succinic acid, glutaric acid, adipic acid, sebacic acid, azealic acid, or their derivatives, e.g., alkyl esters, acid chlorides, or their anhydrides and the diols comprise such monomers as ethylene glycol, propylene glycol, 1,3-propanediol, 1,4-butanediol, 1,6-hexanediol, or 1,4-cyclohexanedimethanol. This includes polyesters such as polybutylene succinate (PBS) and polybutylene succinate-adipate (PBSA). Additionally, aliphatic polyesters include those prepared by ring-opening polymerization of cyclic monomers or lactones such as polycaprolactone (PCL). The aliphatic/aromatic polyesters include copolyesters of polyethylene terephthalate (PET) and polybutylene terephthalate (PBT) with the diacids and diol listed previously.

The recyclate PVC polymers tensile properties are modified by blending with the polyester additives. Combining (e.g., mixing or blending) the recyclate polymer (e.g., PVC polymer) and polyester additives can provide the following benefits compared to recyclate polymer without biodegradable additives such as: (1) higher tensile elongation (2) higher tensile toughness (3) higher notched Izod impact strength (4) improved tear strength, resulting in the ability to use more recyclate polymer in the production of articles, films and the like (5) better UV stability as measured by ASTM G155-2005 (6) improved fungal resistance as measured by ASTM G21-09 and/or (7) better thermal stability of recyclate as shown by lower melt viscosity during processing (prevents crosslinking of recyclate polymer).

The temperatures experienced by a polymer during processing can cause a drop in mechanical strength due to thermal degradation, which can in turn limit the amount of scrap polymer that can be re-utilized in making new products. Increased mechanical strength is therefore useful in that it allows the polymers to be reused and at much higher weight percent addition. Additionally, articles made from the compositions described herein exhibit the same or greater tensile toughness, impact strength or tear properties. The increases in tensile toughness for the recyclate PVC polymer can be 10-40%, tensile stress at break can be 10-36% and stress at yield can be 10-41%. The increases in tear resistance can be 30-60%. The increase in notched Izod impact strength can be 10-20 fold.

The degree of crystallinity calculated for the compositions of the invention can be determined by various methods, for example, density calculations, x-ray and electron diffraction, differential scanning calorimetry, infrared absorption (FTIR), Raman spectroscopy and the like.

Physical properties and rheological properties of both the recyclate polymer and polyester additive materials depend on the molecular weight and distribution of the polymer. "Molecular weight" is calculated in a number of different ways. Unless otherwise indicated, "molecular weight" refers to weight average molecular weight.

"Number average molecular weight" ($M_n$) represents the arithmetic mean of the distribution, and is the sum of the products of the molecular weights of each fraction, multiplied by its mole fraction ($\Sigma N_i M_i / \Sigma N_i$).

"Weight average molecular weight" ($M_w$) is the sum of the products of the molecular weight of each fraction, multiplied by its weight fraction ($\Sigma N_i M_i^2 / \Sigma N_i M_i$). $M_w$ is generally greater than or equal to $M_n$.

The weight average molecular weight of the polyester additives used in the compositions of the invention ranges between about 10,000 to about 2.5 million as measured by light scattering and GPC with polystyrene standards. In certain embodiments, the average molecular weight is about 10,000, about 50,000, about 100,000, about 125,000; about 150,000; about 175,000, about 200,000, about 250,000, about 3000,000, about 400,000, about 500,000, about 600,000, about 700,000, about 800,000, about 900,000, about 1,000,000, about 1,200,000, about 1,300,000, about 1,400,000, about 1,500,000, about 1,600,000, about 1,700,000, about 1,800,000, about 1,900,000 about 2,000,000 about 2,100,000 about 2,200,000 about 2,300,000, about 2,400,000 about 2,500,000 g/mole.

Recycling Polymers

It is inevitable during the melt processing of polymers when making finished products (films, sheets, profiles or other parts) that waste polymer material will be generated. The origin of the waste can be from scrap (flash, sprues, runners generated during molding operations), rejected parts or purge material utilized during equipment startup or shutdown. For many polymers, however, generated waste material can be collected and added directly back into the melt process aiding both the economics and environmental impact of the overall polymer manufacturing process. In the industry, several terms to describe the type of polymer waste are known to those skilled in the art. For example, as described above "scrap" refers to waste polymer material that is generated primarily during molding or extrusion of parts; "regrind" refers to scrap that is first chopped, crushed or ground to a specific particle size prior to blending with virgin polymer resin; "reprocessed" or "repro" plastic is regrind that has been pelletized prior to use and sometimes incorporates one or more additives to aid in material processing or finished product properties; "recycled" polymer refers to a blend of repro or regrind and virgin polymer resin that has been processed into finished articles. "Virgin" polymer refers to thermoplastic resin that has not been previously processed into finished products. This does not include thermoset or thermoplastic elastomer polymer resins.

The amount of regrind or repro that can effectively be added to virgin polymer resin into finished articles depends on the amount of contamination and thermal degradation that has occurred in the regrind or repro material. This is due to the fact that properties such as strength, impact resistance, softening temperature and weatherability (for outdoor applications) depend on maintaining a high molecular weight for the regrind or repro material. Generally, a recycled plastic or polymer product may safely contain 20-25% by weight regrind or repro of the same grade polymer as the virgin material without the need to retest product performance. For addition of greater than 25% by weight repro or regrind, it is recommended that product performance be retested to ensure compliance. UL (Underwriters Laboratory) has set recommendations for use of regrind plastics in a variety of product applications (see www.UL.com).

Polyvinyl Chloride (PVC)

Polyvinylchloride (PVC) is a versatile, thermoplastic polymer that is currently used in the production of hundreds of consumer products encompassing such diverse commercial markets as construction, electronics, healthcare, and other applications. At the global level, demand for PVC well exceeds 35 million tons per year making it the third largest volume thermoplastic behind polyethylene and polypropylene. The reason polyvinylchloride is so widely used to manufacture products is due to a combination of its low cost, versatility and desirable material properties. Notable material properties include excellent resistance to acids, bases, aliphatic hydrocarbon solvents, oils, and oxidizing agents; good flame retardancy (self-extinguishing); good weatherability especially when suitable additives are incorporated (stabile to ozone and UV exposure); good insulating properties for low frequency electrical systems; good low temperature mechanical properties and PVC products generally have long life with concomitantly low maintenance costs.

The versatility of PVC is due in part to its ability to accept large amounts of additives or fillers which alter its material properties considerably leading to a wide variety of applications. It therefore can be fabricated efficiently by calendaring, extrusion or coating into a very wide range of both rigid, semi-rigid and flexible products. The additives that are incorporated into PVC the most by far are plasticizers which generally impart "rubber-like" properties to the PVC by lowering the glass transition temperature ($T_g$). Plasticizers also impart low temperature resistance to embrittlement or mechanical fracture. The compatibility or miscibility of a plasticizer with a given polymer is its most important property whereby high "compatibility" means a homogenous mixture of a plasticizer and polymer having optimum material properties. It should be noted that other additives such as heat stabilizers, UV stabilizers, impact modifiers and processing aids are also important for optimizing the performance of PVC formulations.

The most common plasticizers used to date to improve the flexibility of PVC have been phthalates. Other types of plasticizers such as phosphates, adipates, azelates and sebacates are also utilized to improve the flexibility of polyvinylchloride especially at low temperatures. More recently, PVC compounders have been evaluating biobased plasticizers as an alternative to the petroleum-derived plasticizers in order to minimize the impact on the environment both during production of the plasticizer and end-of-life degradation of PVC products. Typical biobased PVC plasticizers include trialkyl trimellitate esters, vegetable-based esters such as hydrogenated castor oil, succinates and levulinic acid esters. The major shortcoming of a number of these plasticizers, both petroleum-derived and biobased are that they are low molecular weight compounds which can be extracted or even lost through volatilization from PVC especially in elevated temperature applications. Loss of the plasticizer over time leads to stiffening, embrittlement and ultimately failure of the PVC part.

Pure polyvinyl chloride without any plasticizer is a white, brittle solid and is made by polymerization of the chloroethene monomer. The polymerization reaction used to prepare polyvinylchloride (PVC) is shown below:

A number of different processes can be used to prepare the polymer including emulsion, suspension and bulk polymerization methods. PVC is available in several different forms including solid, water-based emulsions (latex) or solids suspensions in plasticizers (plastisols). Producers of PVC materials include Dupont (ELVAX™ PVC), Shell (Carina™ PVC), Wacker (VIRMOL™ PVC) and Sumitomo (SUMILIT™ PVC).

Solid PVC resins are often characterized by a K value. This is a number calculated from dilute solution viscosity measurements of a polymer, used to denote degree of polymerization or molecular size. The formula for calculating the PVC K value is given as:

$$\frac{\log(N_S/N_0)}{c} = \frac{75K^2}{1+1.5Kc} + K$$

where:
$N_S$=viscosity of the solution
$N_0$=viscosity of the solvent
c=concentration in grams per ml
The higher the K value, the higher the molecular weight of the PVC resin and the melt viscosity.

Thermal Stability of PVC

Even though polyvinylchloride has been one of the most important polymeric materials over the past few decades, it is well known that the PVC has the disadvantage of having relatively low thermal stability. Thermal stability in general relates to the process whereby through high temperature, high pressure, oxidation or mechanical stress, the long chains of a polymer begins to break and react with one another thereby changing the properties of the polymer. Since thermoplastic materials are usually formed into products by the application of heat, pressure and/or mechanical stress, degradation can pose a serious problem for product performance.

For PVC, it is known that thermal degradation begins to occur at about 190° C. and initially involves the stripping off of hydrogen chloride (dehydrochlorination) with the concomitant formation of conjugated double bonds or polyene sequences leading to discoloration of the polymer. The polyene sequences can further react to form either crosslinks or cyclize to form benzene and toluene volatiles. In the presence of oxygen, oxidation reactions can also occur leading to chain scission and molecular weight reduction. Thermal degradation thus causes both chemical and physical changes, which then lead to some problems due to PVC's reduced performance.

It has been found that the initiation of dehydrochlorination in PVC occurs simultaneously on multiple positions along the polyvinylchloride backbone chain where allyl chloride structures exist. These chlorine atoms which are adjacent to double bonds are more thermally labile than the corresponding hydrogen atoms and are therefore easily lost at high temperatures. Once hydrogen chloride (HCl) is formed by this reaction, the HCl released acts to accelerate the thermal degradation process of the PVC polymer. To prevent thermal degradation from occurring in polyvinylchlorides, additives such as organotin mercaptides/sulfides or metal carboxylates are usually added. The metal carboxylates are mixtures based on salts of aliphatic (oleic) or aromatic (alkylbenzoic) carboxylic acids usually with combinations of barium/zinc or calcium/zinc metals. These additives improve thermal stability by acting directly at the dehydrochlorination initiation site and/or by reacting with the free HCl generated. In the case of the metal carboxylates, reaction with HCl produces chloride salts which can also have a destabilizing effect on the PVC. Therefore co-stabilizers such as polyols, phosphites and epoxy plasticizers are often used along with the metal carboxylates to improve initial color, transparency and long term PVC stability.

For semi-rigid and flexible polyvinylchlorides, plasticizer's are also a major component of the overall product formulation. It has been found that plasticizer type, concentration and oxidative stability (formation of peroxide radicals) all affect the thermal stability of PVC. Studies on the influence of plasticizers on PVC thermal stability have suggested that solvation of the PVC chains by the plasticizer can have a positive thermal stabilizing effect on the PVC polymer (D. Braun, "*Thermal Degradation of Polyvinyl-Chloride*" in Developments in Polymer Degradation, 1981; M. Semsarzadeh et. al., *Iranian Polymer Journal*, vol. 14, No 9, 769 (2005)).

Measurement of the thermal stability of PVC has been carried out by a variety of techniques. These are based on changes in color on heating PVC test sheets (static heat test), temperature at which first weight loss for PVC occurs on heating (dynamic heat test) or the time to detect HCl when PVC is heated. For the dynamic heat test, Thermogravimetric Analysis (TGA) can be carried out on a PVC sample where by the sample is heated under a nitrogen or oxygen atmosphere while the % weight loss versus temperature is recorded. Using TGA, the temperature at which thermal degradation starts is defined either as the point at which catastrophic weight loss starts occurring ($T_{onset}$), or the temperature where the percent weight loss reaches 1% or 5% of the initial sample weight. The more thermally stable the PVC sample, the higher the temperature where degradation is measured to start.

Recycling PVC

Polyvinyl chloride or PVC is the least post-consumer recycled plastic per usage amount, in the United States. The Environmental Protection Agency calculates that 910,000 tons of PVC waste are generated annually but less than a quarter of 1 percent is recovered for recycling. Recovinyl, a European PVC recycling organization, reported that for 2011 the PVC recycling tonnage was as follows: profile 107,000 tons; flexible cables 79,000 tons; pipe 25,000 tons; rigid film 6,000 tons; and mixed flexible 38,000 tons. Recovinyl also reported that the product markets which use recycled PVC material include 75% in flooring, 15% for foils, 5% for traffic cones, 3% for hoses and 2% for other applications. Although postconsumer PVC recycling rates are relatively low, PVC can however be turned into new feedstock material. The most common method for this today is mechanical recycling which is a process that grinds the material into a powder base for new plastic products. Most PVC with recycled content has been mechanically recycled from industrial scrap or waste material.

Polyester Additives

Polyester additives suitable for practicing the disclosed invention can be aliphatic or aliphatic/aromatic polyesters. Polyesters suitable as polyester additives or as component of a polyester additive can be produced by a number of different polymerization technologies including: biological synthesis inside living cells as is the case for polyhdyroxyalkanoate biopolymers or can be produced by traditional chemical synthetic approaches.

Polyhydroxyalkanoates

Polyhydroxyalkanoates are aliphatic polyesters produced by a broad range of natural and genetically engineered bacteria as well as genetically engineered plant crops (Braunegg et al., (1998), *J. Biotechnology* 65:127-161; Madison and Huisman, 1999, *Microbiology and Molecular Biology Reviews*, 63:21-53; Poirier, 2002, *Progress in Lipid Research* 41:131-155). These polymers are biodegradable thermoplastic materials, produced from renewable resources, with the potential for use in a broad range of industrial applications (Williams & Peoples, *CHEMTECH* 26:38-44 (1996)).

Over 100 different types of monomers have been incorporated into the PHA polymers (Steinbüchel and Valentin, 1995, *FEMS Microbiol. Lett.* 128:219-228.

The polyhydroxyalkanoate biopolymers preferably contain one or more units of the following formula:

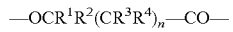

—OCR¹R²(CR³R⁴)ₙ—CO— wherein n is 0 or an integer; and wherein $R^1$, $R^2$, $R^3$, and $R^4$ are independently selected from saturated and unsaturated hydrocarbon radicals, and hydrogen atoms.

In some embodiments, the PHA in the methods described herein is a homopolymer (where all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as P3HB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)). In some embodiments the PHAs can be copolymers and in-particular co-polymers of 3-hydroxybutyrate (PHB) polymerized with one or more co-monomers. Examples of PHA copolymers suitable for practicing this invention include poly-3-hydroxybutyrate-co-3-hydroxypropionate (hereinafter referred to as PHB3HP), poly-3-hydroxybutyrate-co-lactic acid (hereinafter referred to as PHBLA) poly-3-hydroxybutyrate-co-4-hydroxybutyrate (hereinafter referred to as P3HB4HB), poly-3-hydroxybutyrate-co-4-hydroxyvalerate (hereinafter referred to as PHB4HV), poly-3-hydroxybutyrate-co-3-hydroxyvalerate (hereinafter referred to as PHB3HV), poly-3-hydroxybutyrate-co-3-hydroxyhexanoate (hereinafter referred to as PHB3HH) and poly-3-hydroxybutyrate-co-5-hydroxyvalerate (hereinafter referred to as PHB5HV) and poly-3-hydroxybutyrate-co-6-hydroxyhexanoate (hereinafter referred to as PHB6HH). poly 3-hydroxybutyrate-co-3-hydroxyoctanoate (hereinafter referred to as PHB3HO). Other PHAs useful for practicing this invention may contain a range of 3-hydroxymoners selected from 3HH, 3HO, 3HD etc. and are typically produced by fermentation of vegetable oils or fatty acids.

In certain embodiments, the starting PHA can be a copolymer (containing two or more different monomer units) in which the different monomers are randomly distributed in the polymer chain. By selecting the monomer types and controlling the ratios of the monomer units in a given PHA copolymer a wide range of material properties can be achieved. Although examples of PHA copolymers having two different monomer units have been provided, the PHA can have more than two different monomer units (e.g., three different monomer units, four different monomer units, five different monomer units, six different monomer units) An example of a PHA having 4 different monomer units would be PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least 70% by weight of the total monomers, preferably 85% by weight of the total monomers, most preferably greater than 90% by weight of the total monomers for example 92%, 93%, 94%, 95%, 96% by weight of the copolymer and the HX comprises one or more monomers selected from 3HH, 3HO, 3HD, 3HDd.

It is useful to describe these copolymers by reference to their material properties as follows. Type 1 PHB copolymers typically have a comonomer content in the range of 3 weight % to 15 weight % of the total monomers in the copolymers, a glass transition temperature ($T_g$) in the range of 6° C. to −10° C., and a melting temperature $T_m$ of between 80° C. to 180° C. Type 2 PHB copolymers typically have a comonomer content of between 16 weight % and 80 weight % of the total monomers in the PHB copolymer, $T_g$ of −20° C. to −50° C. and Tm of 55° C. to 90° C. In particular embodiments, the Type 2 copolymer has a phase component with a $T_g$ of −15° C. to −45° C. and no detectable $T_m$.

PHAs for use in the methods and compositions described in this invention can be selected from: PHB or a Type 1 PHB copolymer; a PHA blend of PHB with a Type 1 PHB copolymer where the PHB content by weight of PHA in the PHA blend is in the range of 5% to 95% by weight of the PHA in the PHA blend; a PHA blend of PHB with a Type 2 PHB copolymer where the PHB content by weight of the PHA in the PHA blend is in the range of 5% to 95% by weight of the PHA in the PHA blend; a PHA blend of a Type 1 PHB copolymer with a different Type 1 PHB copolymer and where the content of the first Type 1 PHB copolymer is in the range of 5% to 95% by weight of the PHA in the PHA blend; a PHA blend of a Type 1 PHB copolymer with a Type 2 PHA copolymer where the content of the Type 1 PHB copolymer is in the range of 30% to 95% by weight of the PHA in the PHA blend; a PHA blend of PHB with a Type 1 PHB copolymer and a Type 2 PHB copolymer where the PHB content is in the range of 10% to 90% by weight of the PHA in the PHA blend, where the Type 1 PHB copolymer content is in the range of 5% to 90% by weight of the PHA in the PHA blend and where the Type 2 PHB copolymer content is in the range of 5% to 90% by weight of the PHA in the PHA blend.

The PHA blend can also be a blend as disclosed in U.S. Published Application No. US 2004/0220355, International Publication No. WO 2010/008445, which was published in English on Jan. 21, 2010, and designated the United States, and is titled "Branched PHA Compositions, Methods For Their Production, And Use In Applications," which was filed in English and designated the United States. These applications are incorporated by reference herein in their entirety.

Microbial systems for producing the PHB copolymer PHBV are disclosed in, e.g., U.S. Pat. No. 4,477,654 to Holmes, which is incorporated herein by reference in its entirety. U.S. Published Application No. US 2002/0164729 (also incorporated herein by reference in its entirety) by Skraly and Sholl describes useful systems for producing the PHB copolymer PHB4HB. Useful processes for producing the PHB copolymer PHB3HH have been described (Lee et al., 2000, *Biotechnology and Bioengineering* 67:240-244; Park et al., 2001, *Biomacromolecules* 2:248-254 and in US Patent Publication Number US2011/0091948A1 to Kaneka Corporation). Processes for producing the PHB copolymers PHB3HX have been described by Matsusaki et al. (*Biomacromolecules* 2000, 1:17-22). Systems for producing PHA copolymers comprising 2-hydroxyacids have also been described (Matsumoto, K and Taguchi, S. (2013) Applied and Microbiol. Biotechnol. 0/0, 1-13.) PHBV, PHB4HB and PHBH copolymers are commercially available.

In determining the molecular weight techniques such as gel permeation chromatography (GPC) can be used. In the methodology, a polystyrene standard is utilized. The PHA can have a polystyrene equivalent weight average molecular weight (in daltons) of at least 500, at least 10,000, or at least 50,000 and/or less than 2,000,000, less than 1,000,000, less than 1,500,000, and less than 800,000. In certain embodiments, preferably, the PHAs generally have a weight-average molecular weight in the range of 100,000 to 700,000. For example, the molecular weight range for PHB and Type 1 PHB copolymers for use in this application are in the range of 400,000 daltons to 1.5 million daltons as determined by GPC method and the molecular weight range for Type 2 PHB copolymers for use in the application 100,000 to 1.5 million daltons.

Aliphatic Polyester Additives

Included in this group of polyester additives are "non-PHA" polymers based on the condensation product of petroleum-based or biobased diacids and diols monomers. The diacids include monomers such as succinic acid, glutaric acid, adipic acid, sebacic acid, azealic acid, or their derivatives, e.g., alkyl esters, acid chlorides, or their anhydrides. The diols comprise such monomers as ethylene glycol, propylene glycol, 1,3-propanediol, 1,4-butanediol, 1,6-hexanediol, or 1,4-cyclohexanedimethanol.

Examples of non-PHA biodegradable polymers based on diacids/diol monomers includes polybutylene succinate (PBS) and polybutylene succinate adipate (PBSA). PBS and PBSA are synthetic, petroleum-based aliphatic polyesters, typically made by condensation polymerization of one or more diacids and one diol followed by chain extension using multi-functional isocyanates. PBS is a combination of 1,4-butanediol and succinic acid, while PBSA is a combination of 1,4-butanediol, succinic acid, and adipic acid. Although typically synthesized from petroleum, it is also possible for the monomers that make up PBS or PBSA to be produced from biobased feedstock. Commercial producers of PBS and PBSA include Showa High Polymer (BIONOLLE®), SkyGreen BDP, SK Polymer, Ire Chemicals and Samsung Chemicals.

The two polymers are reportedly biodegradable at ambient temperatures (i.e., are "cold compostable") in soil and marine conditions. PBS however degrades more slowly compared to PBSA. Further, PBS and PBSA are known to biodegrade more slowly than PHAs, which are also cold-compostable.

Of the two diacids/diol polymers, PBS has the higher crystallinity, and is better suited for molding applications, while PBSA is softer and has a lower crystallinity which is better suited to film applications. Both polymers have a low (sub-zero) glass transition temperature (PBS Tg~–10° C.; PBSA Tg~–45° C.), and their processing temperatures overlap with PHAs and PVC recyclates (PBS Tm ~120° C.; PBSA Tm ~114° C.). Because of their low Tg values, PBS and PBSA have been used as blend modifiers for other biodegradable polymers such as PLA (U.S. Pat. No. 5,883,199) and PHA's (U.S. Pat. No. 8,524,856).

Another type of aliphatic polyester is produced by catalyzed ring-opening polymerization (ROP) of lactones. One such polymer is poly(e-caprolactone) which is generally obtained by ROP of e-caprolactone in the presence of aluminium isopropoxide. PCL is widely used as a PVC solid plasticizer or for polyurethane applications. But, it finds also some application based on its biodegradable character in domains such as controlled release of drugs, soft compostable packaging to name a few. Different commercial grades are produced by Solvay (CAPA®) or by Union Carbide (Tone®). PCL has a very low Tg (–61° C.) and a low melting point (65° C.), which could be a handicap in some applications. Therefore, PCL is generally blended or modified (e.g., copolymerisation, crosslink).

Aliphatic/Aromatic Polyester Additives

Aliphatic/aromatic polyesters can be synthesized by the polycondensation of aliphatic diols and aromatic dicarboxylic acids. The aromatic ring is resistant to hydrolysis, preventing biodegradability. Polyethylene terephthalate (PET) and polybutylene terephthalate (PBT) are formed by the polycondensation of aliphatic glycols and terephthalic acid. The biodegradability of aromatic polyesters can be modified by the addition of monomers that are not resistant to hydrolysis such as aliphatic diol or diacid groups which may be petroleum-based or biobased. The addition of such hydrolysis-sensitive monomers creates chemically vulnerable sites for hydrolysis to occur along the polymer backbone chain.

Aliphatic-aromatic polyesters can also be made by polycondensation of aliphatic diols, but with a mixture of aromatic and aliphatic dicarboxylic acids. For instance, modification of PBT by addition of aliphatic dicarboxylic acids can produce polybutylene succinate terephthalate (PBST) (butanediol as the aliphatic diol and succinic and terephthalic acid). Another example is the family of polyesters sold under the trade name BIOMAX® (DuPont), the members of which are polymerized from PET and a variety of aliphatic acid monomers such as dimethylglutarate and diethylene glycol. In the synthesis of polybutylene adipate terephthalate (PBAT), butanediol is the diol, and the acids are adipic and terephthalic acids. Commercial examples include ECOFLEX® (BASF), ENPOL® (Samsung Fine Chemicals.) and EASTAR BIO® (Eastman). ECOFLEX® has a melt temperature ($T_m$) of about 110° C. to about 120° C., as measured by differential scanning calorimetry (DSC). Another example is polytetramethylene adipate terephthalate (PTMAT) which is synthesized from tetramethylene glycol and adipic and terephthalic acids. The biodegradable aliphatic-aromatic polyester can be a co-polyester. It can also itself be a blend of such polyesters or co-polyesters.

Recyclate Blends

A further embodiment of the present invention is a recyclate blend comprising a recyclate polymer and a polyester additive of the present invention. The recylate polymer can be a recyclate poly (vinyl chloride) (PVC), a recyclate nylon 6, a recyclate polyoxymethylene (POM) or a recyclate poly(methyl methacrylate), and the polyester additive can comprises a polyhydroxyalkanoate or a blend of polyhydroxyalkanoates (PHA), an aliphatic polyester incorporating diols and diacids, a polybutylene-succinate or a polybutylene-succinate-adipate, an aliphatic-aromatic polyester such as polybutylene-adipate-terephthalate or a combination thereof. The recyclate blends can further include additives such as inert fillers, nucleating agent(s), compatibilizer(s), plasticizer(s) or anti-slip additive(s).

With regard to PVC recyclate blends, the percentages of PVC recyclate in the PVC recyclate/polyester additive blend can be 50% to 95% by weight, for example 70-95% by weight. In certain compositions of the invention, the percentages of PVC recyclate and polyester additive of the total polymer compositions ranges from about 95% PVC to about 5% polyester additive or about 50% PVC to about 50% polyester additive by weight. For example the PVC/polyester additive ratio can be 95/5, 90/10, 85/15, 80/20, 75/25, 70/30, 65/35, 60/40, 55/45 or 50/50.

Thermal Stabilization of PVC Recyclate/PHA Blends

The thermal degradation of PVC recyclate is governed by the following degradation reactions: dehydrochlorination, autooxidation, mechanical/chemical chain scission and crosslinking. In commercial applications, these degradation mechanisms are controlled by the addition of heat stabilizers which are commonly composed of organic salts containing Na, K, Ca, Ba or Zn metals. In the presence of polyhydroxyalkanoates, such as poly-3-hydroxybutyrate, poly-4-hydroxybutyrate or their copolymers, these heat stabilizers could accelerate the thermal degradation of the PHA polymers themselves and therefore care must typically be taken to choose the appropriate stabilizers which will simultaneously minimize PVC recyclate degradation but not accelerate the thermal degradation of the PHA.

PVC heat stabilizers which prevent the dehydrochlorination reaction include the salts of strongly or moderately basic metal cations such as Na, K, Ca, Ba, Sr, Mg, Pb. They are additionally combined with primary metal salts, such as Zn, that participate in the chlorine displacement reactions. Suitable combinations of mixed metal stabilizers include Ba/Zn or Ca/Ba/Zn which have been shown to provide good overall stabilization, initial color and long term thermal stability of PVC. The Ba/Zn cation ratios in the salt mixtures could be in the range of about 1:1 to about 10:1 and preferably of about 3:1 to about 8:1, more preferably of about 3.5:1 and 4:1 or 5:1 to 6:1. Commercial heat stabilizers useful in the described invention include MARK® 4781a (Galata Chemicals) heat stabilizer and PLASTISTAB™ 2442 (AM Stabilizers) heat stabilizer and the like.

The salt mixtures also contain an anionic group comprising two different types of carboxylic acid groups. One of the types consists of one or more anions selected from the group of linear or branched, saturated or unsaturated aliphatic carboxylic acids. The most preferred carboxylic acids are oleic acid, neodecanoic acid and isomers of octanoic acid, such as 2-ethyl hexanoate. The second type of anion consists of one or more aromatic carboxylic acids. The aromatic carboxylic acids are molecules containing a phenyl ring to which the carboxylic moiety is directly or indirectly bonded through a saturated or unsaturated alkylene bridge; the phenyl ring can be additionally substituted with one or more alkyl groups. The preferred aromatic carboxylic acids are substituted derivatives of benzoic acid; the most preferred aromatic carboxylic acids, and in particular isopropyl benzoic acid, 4-ethyl benzoic acid, 2-methyl benzoic acid, 3-methylbenzoic acid, 4-methylbenzoic acid, 3,4-dimethyl benzoic acid and 2,4,6-trimethyl benzoic acid. The presence of aromatic carboxylic acids is very important because their salts improve the initial color of the PVC formulations during processing without affecting transparency. Optionally, one or more co-stabilizers, such as β-diketones and dihydropyridines, solutions of barium carboxylate/barium carbonate (overbased barium see U.S. Pat. No. 5,656,202), zinc salts of aliphatic carboxylic acids (to have more flexibility in the ratio Ba/Zn), organic derivatives of phosphorous and, high boiling point hydrocarbons and plasticizers used as diluents can be added to the thermal stabilizers.

Liquid thermal PVC stabilizers are generally comprised of a) a mixture of barium and zinc salts of one or more linear or branched aliphatic saturated or unsaturated carboxylic acids containing from 6 to 20 carbon atoms and of one or more aromatic carboxylic acid containing from 8 to 10 carbon atoms, wherein the weight ratio of aliphatic acids salts to aromatic acids salts is higher than 3:1 and b) one or more organic phosphites of the formula $R^1OP(OR^2)OR^3$ wherein $R^1$, $R^2$ and $R^3$ are the same or different and each is an alkyl group containing from 6 to 15 carbon atoms or phenyl group or C10-C20 alkyl aryl. These types of stabilizers are described in US Patent App. No. 2294122, European Patent No. 0792317, U.S. Pat. No. 58,800,189 and International Patent App. No. WO2010000734A1. It has been found that the liquid type stabilizers show the best thermal stability performance in PVC/Polyester additive blends especially when combined with secondary heat stabilizers such as plasticizers, antioxidants and lubricants which help to prevent thermo-oxidative degradation. Another type of mixed metal stabilizer composition is described in European Patent App. No. 0849314 A1 which consists of (A) about 10 to about 40 parts by weight of a zinc carboxylate; (B) about 50 to about 80 parts by weight of an alkyl ester of thiodipropionic acid; and (C) about 5 to about 20 parts by weight of a phenolic antioxidant.

Other important PVC heat stabilizers that may be used in PVC/PHA blends include mild alkalis such as sodium carbonate; various metal-free organic compounds such as the polyols, e.g. mannitol, sorbitol, glycerol and pentaerythritol; 1,2-epoxides, e.g. soy bean oil epoxide, isooctyl epoxystearate and the diglycidyl ether of 2,2-bis(p-hydroxyphenyl) propane; nitrogen compounds such as phenylurea, N,N'-diphenylthiourea, and 2-phenylindole; organotin mercaptides (U.S. Pat. No. 2,641,588); mercaptoesters and thioglucolates which reportedly impart multifunctional stabilization (European Pat. No. 0813572); diketones complexed with metal salts of organic acids such as calcium benzoate, 1,3-diphenylpropane-1,3-dionate (European Pat. No. 1517878); alkyl tin compounds as described in European Pat. App. No. 1877413.

Co-stabilizers such as organic phosphites are also known to impart thermal stability to chlorine-containing polymers and may also be suitable for PVC/PHA blends. These include triesters of phosphoric acid such as trioctyl, tridecyl, tridodecyl, tritridecyl, tripentadecyl, trioleyl, tristearyl, triphenyl, tricresyl, tris(nonylphenyl), tris(2,4-tert-butylphenyl) and tricyclohexyl phosphite (International Pat. No WO2005019323); phosphite compositions comprising at least two of a tris(dibutylaryl) phosphite, a tris(monobutylaryl) phosphite, a bis(dibutylaryl)monobutylaryl phosphite, and a bis(monobutylaryl)dibutylaryl phosphite (U.S. Pat. No. 8,008,384); phosphite mixtures with amines to make them hydrolytically stable (European Patent App. No. 2459575).

Additives

In certain embodiments, various additives are added to the compositions. Examples of these additives include, but are not limited to, antioxidants, pigments, compatibilizers, thermal and UV stabilizers, inorganic and organic fillers, plasticizers, and optionally nucleating agents which are not typically needed in the compositions of the invention, anti-slip agents, anti-blocking agents and radical scavengers.

In compositions for use in the methods and compositions described herein, for example, plasticizers are often used to change the glass transition temperature and modulus of the composition, but surfactants may also be used. Lubricants may also be used, e.g., in injection molding applications. Plasticizers, surfactants and lubricants may all therefore be included in the overall composition.

In other embodiments, the compositions and methods of the invention include one or more plasticizers. The plasticizers can be petroleum based and/or biobased. Examples of plasticizers include phthalic compounds (including, but not limited to, dimethyl phthalate, diethyl phthalate, dibutyl phthalate, dihexyl phthalate, di-n-octyl phthalate, di-2-ethylhexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate, and n-decyl phthalate), phosphoric compounds (including, but not limited to, tricresyl phosphate, trioctyl phosphate, triphenyl phosphate, octyl diphenyl phosphate, cresyl diphenyl phosphate, and trichloroethyl phosphate), adipic compounds (including, but not limited to, dibutoxyethoxyethyl adipate (DBEEA), dioctyl adipate, diisooctyl adipate, di-n-octyl adipate, didecyl adipate, diisodecyl adipate, n-octyl n-decyl adipate, n-heptyl adipate, diisononyl and n-nonyl adipate), sebacic compounds (including, but not limited to, dibutyl sebacate, dioctyl sebacate, diisooctyl sebacate, and butyl benzyl sebacate), azelaic compounds, citric compounds (including, but not limited to, triethyl citrate, acetyl triethyl citrate, tributyl citrate, acetyl tributyl citrate, and acetyl trioctyl citrate), glycolic compounds (including, but not limited to, methyl phthalyl ethyl glycolate, ethyl phthalyl ethyl glycolate, and butyl phthalyl ethyl glycolate), trimellitic compounds (including, but not limited to, trioctyl trimellitate and tri-n-octyl n-decyl trimellitate), phthalic isomer compounds (including, but not limited to, dioctyl isophthalate and dioctyl terephthalate), ricinoleic compounds (including, but not limited to, methyl acetyl, recinoleate and butyl acetyl recinoleate), polyester compounds (including, but not limited to reaction products of diols selected from butane diol, ethylene glycol, propane 1,2 diol, propane 1,3 diol, polyethylene glycol, glycerol, diacids selected from adipic acid, succinic acid, succinic anhydride and hydroxyacids such as hydroxystearic acid, epoxidized soy bean oil, chlorinated paraffins, chlorinated fatty acid esters, fatty acid compounds, plant oils, pigments, and acrylic compounds. The plasticizers may be used either alone respectively or in combinations with each other.

In certain embodiments, the compositions and methods of the invention include one or more antioxidants. The antioxidants function as secondary heat stabilizers for the PVC/polyester additive blends and include compounds such as alkylated monophenols, e.g., 2,6-di-tert-butyl-4-methylphenol; alkylthiomethylphenols, e.g., 2,4-dioctylthiomethyl-6-tert-butylphenol; alkylated hydroquinone's, e.g., 2,6-di-tert-butyl-4-methoxyphenol; hydroxylated thiodiphenyl ethers, e.g., 2,2'-thiobis(6-tert-butyl-4-methylphenol); alkylidenebisphenols, e.g., 2,2'-methylenebis(6-tert-butyl-4-methylphenol); benzyl compounds, e.g., 3,5,3',5'-tetra-tert-butyl-4,4'-dihydroxydibenzyl ether; hydroxybenzylated malonates, e.g., dioctadecyl 2,2-bis(3,5-di-tert-butyl-2-hydroxybenzyl) malonate; hydroxybenzyl aromatics, e.g., 1,3, 5-tris(3,5-di-tert-butyl-4-hydroxybenzyl)-2,4,6-trimethylbenzene; triazine compounds, e.g., 2,4-bisoctylmercapto-6-(3,5-di-tert-butyl-4-hydroxyanilino)-1,3,5-triazine; phosphonates and phosphonites, e.g., dimethyl 2,5-di-tert-butyl-4-hydroxybenzylphosphonate; acylaminophenols, e.g., 4-hydroxylauranilide; esters of β-(3,5-di-tert-butyl-4-hydroxyphenyl)propionic acid, β-(5-tert-butyl-4-hydroxy-3-methylphenyl)propionic acid, P-(3,5-dicyclohexyl-4-hydroxyphenyl)propionic acid; esters of 3,5-di-tert-butyl-4-hydroxyphenylacetic acid with mono- or polyhydric alcohols; amides of β-(3,5-di-tert-butyl-4-hydroxyphenyl) propionic acid e.g. N,N'-bis(3,5-di-tert-butyl-4-hydroxyphenyl-propionyl)hexamethylenediamine, vitamin E (tocopherol) and derivatives of the foregoing. Mixtures of the antioxidants may also be used.

In certain embodiments, the compositions and methods of the invention include one or more surfactants. Surfactants are generally used to de-dust, lubricate, reduce surface tension, and/or densify. Examples of surfactants include, but are not limited to mineral oil, castor oil, and soybean oil. One mineral oil surfactant is Drakeol 34, available from Penreco (Dickinson, Tex., USA). Maxsperse W-6000 and W-3000 solid surfactants are available from Chemax Polymer Additives (Piedmont, S.C., USA). Non-ionic surfactants with HLB values ranging from about 2 to about 16 can be used, examples being TWEEN®-20, TWEEN®-65, SPAN®-40 and SPAN®-85.

Anionic surfactants include: aliphatic carboxylic acids such as lauric acid, myristic acid, palmitic acid, stearic acid, and oleic acid; fatty acid soaps such as sodium salts or potassium salts of the above aliphatic carboxylic acids; N-acyl-N-methylglycine salts, N-acyl-N-methyl-beta-alanine salts, N-acylglutamic acid salts, polyoxyethylene alkyl ether carboxylic acid salts, acylated peptides, alkylbenzenesulfonic acid salts, alkylnaphthalenesulfonic acid salts, naphthalenesulfonic acid salt-formalin polycondensation products, melaminesulfonic acid salt-formalin polycondensation products, dialkylsulfosuccinic acid ester salts, alkyl sulfosuccinate disalts, polyoxyethylene alkylsulfosuccinic acid disalts, alkylsulfoacetic acid salts, (alpha-olefinsulfonic acid salts, N-acylmethyltaurine salts, sodium dimethyl 5-sulfoisophthalate, sulfated oil, higher alcohol sulfuric acid ester salts, polyoxyethylene alkyl ether sulfuric acid salts, secondary higher alcohol ethoxysulfates, polyoxyethylene alkyl phenyl ether sulfuric acid salts, monoglysulfate, sulfuric acid ester salts of fatty acid alkylolamides, polyoxyethylene alkyl ether phosphoric acid salts, polyoxyethylene alkyl phenyl ether phosphoric acid salts, alkyl phosphoric acid salts, sodium alkylamine oxide bistridecylsulfosuccinates, sodium dioctylsulfosuccinate, sodium dihexylsulfosuccinate, sodium dicyclohexylsulfosuccinate, sodium diamylsulfosuccinate, sodium diisobutylsulfosuccinate, alkylamine guanidine polyoxyethanol, disodium sulfosuccinate ethoxylated alcohol half esters, disodium sulfosuccinate ethoxylated nonylphenol half esters, disodium isodecylsulfosuccinate, disodium N-octadecylsulfosuccinamide, tetrasodium N-(1,2-dicarboxyethyl)-N-octadecylsulfosuccinamide, disodium mono- or didodecyldiphenyl oxide disulfonates, sodium diisopropylnaphthalenesulfonate, and neutralized condensed products from sodium naphthalenesulfonate.

One or more lubricants can also be added to the compositions and methods of the invention. Lubricants are normally used to reduce sticking to hot processing metal surfaces but can also act as a secondary thermal stabilizer and include polyethylene, paraffin oils, epoxidized soybean oil and other vegetable oils, and paraffin waxes in combination with metal stearates. Other lubricants include stearic acid, amide waxes, ester waxes, metal carboxylates, and carboxylic acids. Lubricants are normally added to polymers in the range of about 0.1 percent to about 1 percent by weight, generally from about 0.7 percent to about 0.8 percent by weight of the compound. Solid lubricants is warmed and melted before or during processing of the blend.

In film applications of the compositions and methods described herein, anti-block masterbatch is also added. A suitable example is a slip anti-block masterbatch mixture of erucamide (20% by weight) diatomaceous earth (15% by weight) nucleant masterbatch (3% by weight), pelleted into PHA (62% by weight). Others are known to those of ordinary skill in the field of polymer processing.

If desired, an optional nucleating agent is added to the compositions of the invention to aid in its crystallization if needed. Nucleating agents for various polymers are simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, metal salts of organophosphates, and boron nitride, cyanuric acid and the like.

It has been found that a combination of PLASTISTAB® 2442 (4phr), PARAPLEX® G-62 (4.5 phr) and the plasticizer diisononyl adipate (18 phr) additives in PVC/PHA blend formulations described here give very good light stabilizing properties so that no UV light stabilizers are needed for outdoors uses of the formulation.

Application of the Compositions

PVC and the compositions described herein may be used for many applications, including but not limited to construction materials (e.g., pipes, tubing, coatings) and also medical applications (e.g. tubing or bags for liquid storage).

For the fabrication of useful articles, the compositions described herein are processed preferably at a temperature above the crystalline melting point of the polymers but below the decomposition point of any of the ingredients (e.g., the additives described above, with the exception of some branching agents) of the polymeric composition. While in heat plasticized condition, the polymeric composition is processed into a desired shape, and subsequently cooled to set the shape and induce crystallization. Such shapes can include, but are not limited to, a fiber, filament, film, sheet, rod, tube, bottle, or other shape. Such processing is performed using any art-known technique, such as, but not limited to, extrusion, injection molding, compression molding, blowing or blow molding (e.g., blown film, blowing of foam), calendaring, rotational molding, casting (e.g., cast sheet, cast film), or thermoforming. Thermoforming is a process that uses films or sheets of thermoplastic. The polymeric composition is processed into a film or sheet. The sheet of polymer is then placed in an oven and heated. When soft enough to be formed it is transferred to a mold and formed into a shape.

During thermoforming, when the softening point of a semi-crystalline polymer is reached, the polymer sheet begins to sag. The window between softening and droop is usually narrow. It can therefore be difficult to move the softened polymer sheet to the mold quickly enough. Measuring the sag of a sample piece of polymer when it is heated is therefore a way to measure the relative size of this processing window for thermoforming.

Films, Sheets and Tapes

The compositions of the inventions can be used for producing films, sheets, blister pack, shrink wrap, roof membranes, geological membranes and tape with certain properties and/or characteristics.

The films or sheets can be single layer or multilayer. Suitable thicknesses include, 0.005 mm to about 0.01 mm, 0.01 mm, 0.02 mm, 0.03 mm, 0.04 mm, 0.05 mm, 0.06 mm, 0.07 mm, 0.08 mm, 0.09 mm or 0.1 mm. The film or sheet can be optically clear or opaque. The films and sheets can be further processed to tapes. The tapes can optionally include an adhesive layer on one or both sides. Also included are laminates.

Applications

The compositions described herein can be processed into films of varying thickness, for example, films of uniform thickness ranging from 1-200 microns, for example, 10-75 microns, 75 to 150 microns, or from 50-100 microns. Film layers can additionally be stacked to form multilayer films of the same or varying thicknesses or compositions of the same or varying compositions.

Blow molding, which is similar to thermoforming and is used to produce deep draw products such as bottles and similar products with deep interiors, also benefits from the increased elasticity and melt strength and reduced sag of the polymer compositions described herein.

The compositions described herein are provided in any suitable form convenient for an intended application. For example, the composition is provided in pellet for subsequent production of films, coatings, moldings or other articles, or the films, coatings, moldings and other articles.

The polymeric compositions of the present invention can be used to create, without limitation, a wide variety of useful products, e.g., automotive, consumer durable, consumer disposable, construction, electrical, medical, and packaging products. For instance, the polymeric compositions can be used to make, without limitation, films (e.g., packaging films, hay bale wrap, slit film, food wrap, pallet wrap, protective automobile and appliance wrap, etc.), bags (e.g., trash bags, grocery bags, food bags, compost bags, etc.), hygiene articles (e.g., diapers, feminine hygiene products, incontinence products, disposable wipes, etc.), coatings for pelleted products (e.g., pelleted fertilizer, herbicides, pesticides, seeds, etc.), packaging (including, but not limited to, packaging and containers for beverage products, cosmetic products, detergents and cleaning products, personal care products, pharmaceutical and wellness products), golf tees, caps and closures, agricultural supports and stakes, paper and board coatings (e.g., for cups, plates, boxes, etc.), thermoformed products (e.g., trays, containers, moldings, etc.), housings (e.g., for electronics items, e.g., cell phones, PDA cases, music player cases, computer cases, printers, calculators, LCD projectors, connectors, chip trays, circuit breakers, plugs, and the like), wire and cable products (including, but not limited to, wire, cable and coatings for wire and cable for vehicles, cars, trucks, airplanes, aerospace, construction, military, telecommunication, utility power, alternative energy, and electronics), industrial products (such as, but not limited to, containers, bottles, drums, materials handling, gears, bearings, gaskets and seals, valves, wind turbines, and safety equipment), products for transportation (such as, but not limited to, automotive aftermarket parts, bumpers, window seals, instrument panels, consoles, under hood electrical parts, and engine covers), appliances and appliance parts (such as, but not limited to, refrigerators, freezers, washers, dryers, toasters, blenders, vacuum cleaners, coffee makers, and mixers), articles for use in building and construction (such as, but not limited to, fences, decks and rails, floors, floor covering, pipes and fittings, siding, trim, windows, doors, molding, and wall coverings), consumer goods and parts for consumer goods (such as, but not limited to, power hand tools, rakes, shovels, lawn mowers, shoes, boots, golf clubs, fishing poles, and watercraft), healthcare equipment (including, but not limited to, wheelchairs, beds, testing equipment, analyzers, labware, ostomy, IV sets, wound care, drug delivery, inhalers, and packaging). In short, the polymeric products described herein can be used to make the items currently made from conventional petroleum-based polymers.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are hereby incorporated by reference in their entirety.

EXAMPLES

Experimental Methods

Measurement of the Mechanical Properties

Tensile properties of the PVC/biodegradable polymer blends were measured according to ASTM D638-03; Elmendorf resistance to tear propagation was measured according to ASTM D 1922-06; Notched Izod impact was measured according to ASTM D256-10 and Flex modulus according to ASTM D790.

Measurement of UV Stability

The UV stability of Polymer recyclate/PHA films was measured following the procedure outlined in ASTM G155-2005. A Ci65 weatherometer equipped with a Xenon lamp was used as the UV source for exposure of the PHA/PVC films. Changes in film color over time were measured using a Gretag Macbeth Color-Eye 7000A spectrophotometer. The color space parameters L*, a* and b* were measured and the overall change in color DE* was calculated as the square root of the sum of the squares of the color space parameters.

Measurement of Fungal Resistance

The resistance to fungal growth on polymer recyclate/PHA films was measured following the procedure in ASTM G21-09. Multiple films of each formulation were incubated at 28-30° C. and 85% relative humidity for 28 days with 5 different applied fungal organisms and then visually inspected for fungal growth.

Polyester Additives

Exemplary Polyesters

The P3HB-4HB polymers utilized in the PVC recyclate blend examples along with their weight average molecular weights, compositions and biobased content are summarized in Table 1. Several polyhydroxyalkanoate blends (PHA A to C) were used as polyester additive and blended with recyclate PVC to form recyclate blends, specifically, PVC recyclate/PHA blends.

TABLE 1

Summary of P3HB-4HB polymers used as recyclate additives. All of the PHA's were copolymers of 3-hydroxybutyrate and 4-hydroxybutyrate or blends of these.

| Polymer ID | $M_w$ | Weight % 4HB | % Crystallinity | % Biobased Content |
|---|---|---|---|---|
| PHA A* | 650,000 | 8-9 | 20-60 | 91-92 |
| PHA B** | 492,000 | 12-15 | 27-45 | 85-88 |
| PHA C*** | 582,000 | 40-50 | <5 | 100 |

*PHA A: Blend of 18-22% P3HB, 77-83% P3HB-4HB copolymer with 8-14% 4HB by weight
**PHA B: Blend of 34-38% P3HB, 22-26% P3HB-4HB copolymer with 8-14% 4HB by weight and 38-42% P3HB-4HB copolymer with 25-33% 4HB by weight
***PHA C: Copolymer of P3HB-4HB having 40-50% by weight 4HB content Additional PHA's were also blended with PVC regrind and included poly-3-hydroxybutyrate-co-3-hydroxyvalerate having 8 and 12 mol % 3-hydroxyvalerate. These were designated PHBV8 and PHBV12 (Sigma Aldrich); poly-3-hydroxybutyrate-co-3-hydroxyhexanoate having 11 mol % 3-hydroxyhexanoate content designated PHBH11 and polylactic acid (NatureWorks). Also included in the PVC blends examples were poly-butylene-succinate (PBS, BIONOLLE® 1001, Showa High Polymers), polybutylene-succinate-adipate (PBSA, BIONOLLE® 3001, Showa High Polymers) and polybutylene-adipate-terephthalate (PBAT, BIOCOSAFE™ 2003, Zhejiang Hangzha Xinfu Pharmaceutical Ltd.).

PVC Regrind/PHA Formulations and Preparation

The PVC Regrind material used for testing was of three grades: natural, which was a clear medical grade PVC, grey (New England Polymers) and a semi-rigid clear PVC (O'Tech). All PVC materials had been sieved prior to use in order to produce PVC regrind having similar sized particles.

The PVC regrind materials were each compounded (single pass) with PHA A, B or C, PHBV or non-PHA materials using a 16 mm, counter-rotating, Prism twin screw extruder having the following settings (feed zone to die): heated extruder zones were maintained at the following temperatures 172° C./174° C./175° C./177° C./177° C./177° C./179° C./179° C./179° C./179° C.; screw speed was 150-200 rpm; feed rate 10-25% and torque 23-65%. After exiting the extruder, the polymer blend strands were cooled by immersion in a water bath set at room temperature, pelletized and finally dried in an oven. The pellets were then compression molded at 165-175° F. into samples for tensile, tear strength and other tests.

Example 1. Addition of PHA to Medical Grade PVC Regrind

In this example, clear PVC medical grade regrind was compounded separately with PHA A, B or C and then the tensile and tear properties of the blends as well as melt properties were measured. Included with the blends data was a control sample composed of 100% PVC regrind material. Table 1 shows the PVC regrind/PHA formulations as well as the test results for each of the blend compositions.

TABLE 1

Summary of medical grade PVC regrind/PHA formulations and mechanical properties data.

|  | PVC Control | 4 | 5 | 6 | 8 | 10 |
|---|---|---|---|---|---|---|
| Formulation |  |  |  |  |  |  |
| PVC regrind medical grade | 100 | 90 | 85 | 80 | 85 | 85 |
| PHA A |  | 10 | 15 | 20 |  |  |
| PHA B |  |  |  |  |  | 15 |
| PHA C |  |  |  |  | 15 |  |
| Total Parts | 100 | 100 | 100 | 100 | 100 | 100 |
| Mechanical Testing Data |  |  |  |  |  |  |
| Tensile modulus (MPa) | 24.47 | 14.86 | 18.28 | 34.96 | 13.96 | 17.86 |
| Tensile stress at Yield (MPa) | 13.02 | 13 | 11.6 | 18.36 | 10.72 | 15.7 |
| Tensile strain at Yield (%) | 99.52 | 143.47 | 148.58 | 239.84 | 137.47 | 211.18 |
| Tensile stress at Break, (MPa) | 12.73 | 12.72 | 10.98 | 17.28 | 10.51 | 15.87 |
| Tensile strain at Break (%) | 101.08 | 145.64 | 154.92 | 210.52 | 140.08 | 216.34 |
| Energy at Break (J) | 0.77 | 1.04 | 1.10 | 1.78 | 0.90 | 2.09 |
| Tear (N/mm) | 34.70 | 31.59 | 36.11 | 46.50 | 29.14 | 32.60 |

The data from Table 1 shows that with the addition of PHA A, B or C to the PVC regrind material improvements in tensile and tear properties (as compared to the PVC regrind control) were observed for the PVC regrind material after processing. The largest improvements in mechanical properties were found for 20% by weight addition of PHA A, which yielded a 40% increase in tensile modulus and 34% increase in tear strength as compared to the PVC regrind control. The clarity of the medical grade PVC regrind after addition of PHA did not change. However, minor discoloration especially after addition of the PHA C was observed.

Additional film samples of the medical grade PVC regrind were prepared by compounding the PVC with 18 phr diisononyl adipate plasticizer and 15 phr of PHA B or acrylic-styrene-acrylontrile polymer (ROYALTUF® ASA, Galata Chemicals) or acrylonitrile-butadiene-styrene polymer (BLENDEX® ABS, Galata Chemicals). The ASA and ABS polymers are typical polymeric modifiers that are added to PVC regrind in order to improve its properties. The compounded formulations were then compression molded to a thickness of 1.5-3 mm and placed into a Ci65 weatherometer and exposed to UV light (2250 kJ/m$^2$) over a period of several weeks. After the UV exposure was complete, the color of the films was measured and the DE* value calculated. Table 2 shows the comparative results of the color measurement for each of the films.

TABLE 2

Summary of PVC regrind/PHA B, PVC regrind/ABS and PVC regrind/ASA blends color data after UV exposure (2250 kJ/m$^2$). Also included in each of the film formulations was 18 phr DINA plasticizer.

| Formulation | DL* | Da* | Db* | DE* |
|---|---|---|---|---|
| PVC Regrind/PHA B (15 phr) | 0.76 | −0.32 | −1.00 | 1.30 |
| PVC Regrind/ASA (15 phr) | −0.84 | −2.91 | 3.67 | 4.76 |
| PVC Regrind/ABS (15 phr) | −4.42 | −0.61 | 13.65 | 14.36 |

The results in Table 2 show that the PVC regrind blended with the PHA B showed significantly lower change in color after exposure to UV (lower DE* value) indicating better UV stability properties. In contrast the PVC regrind blended with the commercial ABS polymer showed a very dramatic change in color after exposure to the UV. Visually this film formulation showed an intense yellowing over time during UV exposure.

The films of PVC regrind/PHA B blend were also tested for resistance to fungal activity using ASTM G21-09 method. Three 1.5 mm thick films of PVC regrind/PHA B were incubated at 28-30° C. and ≥85 relative humidity with 5 different fungal organisms for 28 days. Also included in this test was a 1.5 mm thick control film sample (run in triplicate) composed of only PVC regrind. After 28 days the results showed that the PVC control showed a small amount of fungal growth on one of the three films. The PVC regrind/PHA B films however showed no actively growing fungal colonies on the surface of the film.

Example 2. Addition of PHA to PVC Regrind

In this example PHA A, B or C was compounded with another PVC regrind material obtained from New England Polymers identified as "gray". The PVC gray regrind samples were prepared in the same way as described in Example 1 and then measured for changes in tensile and tear mechanical properties. Table 3 summarizes the formulations and testing results on these samples. Included in this data, was a PVC regrind control sample that was extruded under the same conditions as the blends as well as a PVC regrind sample that did not go through the extrusion process. This sample was labeled "as received" PVC regrind in Table 3.

TABLE 3

Summary of "gray" grade PVC regrind/PHA formulations and mechanical properties data.

| | "As received" PVC Regrind | PVC Regrind Control | 1 | 2 | 3 | 7 | 9 |
|---|---|---|---|---|---|---|---|
| Formulation | | | | | | | |
| PVC regrind gray | 100 | 100 | 90.0 | 85 | 80 | 85.0 | 85.0 |
| PHA A | | | 10 | 15 | 20 | | |
| PHA B | | | | | | | 15 |
| PHA C | | | | | | 15 | |
| Total Parts | 100 | 100 | 100 | 100 | 100 | 100 | 100.0 |
| Mechanical Testing Data | | | | | | | |
| Modulus (MPa) | 28.1 | 28.54 | 22.92 | 62.01 | 64.44 | 21.18 | 43.48 |
| Tensile stress at Yield (MPa) | 15.41 | 16.16 | 17.5 | 14.48 | 16.07 | 13.92 | 17.47 |
| Tensile strain at Yield (%) | 133.28 | 156.23 | 252.23 | 176.23 | 193.24 | 200.34 | 230.12 |
| Tensile stress at Break (MPa) | 16.1 | 15.84 | 17.44 | 14.39 | 15.99 | 13.87 | 17.47 |
| Tensile strain at Break (%) | 160.08 | 157.61 | 252.93 | 178.31 | 195.41 | 201.2 | 230.21 |
| Energy at Break (J) | 1.66 | 1.60 | 2.67 | 1.61 | 2.23 | 1.60 | 2.37 |
| Tear (N/mm) | 42.58 | 39.76 | 39.79 | 52.09 | 46.07 | 40.76 | 48.81 |

The data in Table 3 shows the same trends as seen in Example 1: addition of PHA A, B and C appeared to improve the tensile and tear properties of the PVC gray regrind material as compared to the PVC regrind control and "as received" PVC regrind. Particularly significant improvements in mechanical properties were observed for PVC regrind formulations having PHA A and B at 15-20% by weight added.

Example 3. Comparison of a Range of Polyesters and Polyester Blends as Polyester Additives to Recyclate PVC (Specifically, PVC Regrind)

In this example, PHA A, B and C, PHBV8 and 12, PHBH11 and PLA biodegradable additives were compared to other non-PHA biodegradable additives e.g. PBS, PBSA and PBAT when blended with the semi-rigid clear PVC regrind material. The biodegradable additives were melt blended with clear PVC regrind at 10, 20 and 30 phr and then tested for hardness, tensile, flexural and notched Izod impact strength properties. Table 4 summarizes the formulations tested as well as the test results.

The data in Table 4 shows that in terms of increased flexibilization, elongation, and toughness of the PVC/additives blends, the non-PHA materials PBS and PBSA performed well at a loading level of 20 phr. In comparision, PHA C performed as well as PBS and PBSA at the higher loading level of 30 phr. PHBV8 @30 phr also performed as well as PBS @20 phr for notched Izod impact modification of the semi-rigid PVC regrind again. All of these additives have low glass transitions temperatures (−45° C.>Tg>−10° C.) which helps maintain good flexibility and toughness of the PVC regrind.

TABLE 4

Comparison of PHA and non-PHA biodegradable additives/PVC regrind blends properties. Biodegradable blend polyester additive components added are in parts per hundred resin(phr). The semi-rigid PVC concentration was equal to 100 phr.

| PVC/PHA Blend Property | Additive phr | PHA A | PHA B | PHA C | PHBV8 | PHBV12 | PHBH11 | PBS | PBSA | PLA | PBAT |
|---|---|---|---|---|---|---|---|---|---|---|---|
| Durometer | 0 | 86 | 86 | 86 | 86 | 86 | 86 | 86 | 86 | 86 | 86 |
| Hardness D | 10 | 86 | 86.5 | 85 | 87 | 85.5 | 87 | 83 | 83 | too brittle | 86 |
| | 20 | 84 | 85 | 85 | — | 84 | 82.5 | 69 | 68 | — | 84 |
| | 30 | 80 | 82 | 70 | — | — | — | — | 50 | — | — |
| Tensile | 0 | 4.2 | 4.2 | 4.2 | 4.2 | 4.2 | 4.2 | 4.2 | 4.2 | 4.2 | 4.2 |
| Elongation | 10 | 11.0 | 32.0 | 15.0 | 21.8 | 13.3 | 9.0 | 20.0 | 28.0 | 2.9 | 28.1 |
| at Break (%) | 20 | 22.2 | 42 | 56 | — | 46 | 40 | 80 | 121 | — | 44 |
| | 30 | 76 | 88 | 120 | — | — | — | — | 73 | — | — |
| Tensile | 0 | 0.14 | 0.14 | 0.14 | 0.14 | 0.14 | 0.14 | 0.14 | 0.14 | 0.14 | 0.14 |
| Toughness | 10 | 0.13 | 0.58 | 0.44 | 0.74 | 0.44 | 0.28 | 0.52 | 0.80 | 0.05 | 1.07 |
| (J) | 20 | 0.47 | 1.06 | 1.20 | — | 1.12 | 1.06 | 1.75 | 2.55 | — | 1.18 |
| | 30 | 1.99 | 2 | 1.97 | — | — | — | — | 0.82 | — | — |

TABLE 4-continued

Comparison of PHA and non-PHA biodegradable additives/PVC regrind blends properties. Biodegradable blend polyester additive components added are in parts per hundred resin(phr). The semi-rigid PVC concentration was equal to 100 phr.

| PVC/PHA Blend Property | Additive phr | PHA A | PHA B | PHA C | PHBV8 | PHBV12 | PHBH11 | PBS | PBSA | PLA | PBAT |
|---|---|---|---|---|---|---|---|---|---|---|---|
| Flexural Modulus (MPa) | 0 | — | — | — | — | — | — | — | — | — | — |
| | 10 | 2185 | 2626 | 2284 | 2537 | 2159 | 2075 | 2073 | 2169 | too brittle | 2383 |
| | 20 | 1589 | 1637 | 1083 | — | 1578 | 1543 | 565 | 437 | — | 2060 |
| | 30 | 854 | 946 | 335 | — | — | — | 136 | — | — | — |
| Notched Izod Impact (ft lb/inch) | 0 | 1.13 | 1.41 | 1.39 | 2.28 | 1.89 | 1.84 | 2.86 | 3.50 | too brittle | too brittle |
| | 10 | 5.20 | 1.53 | 2.78 | — | 1.47 | 1.03 | 14.4 | too flexible | — | 2.8 |
| | 20 | 2.50 | 1.83 | 1.41 | — | — | — | — | — | — | 9.2 |
| | 30 | 1.13 | 1.41 | 1.39 | 2.28 | 1.89 | 1.84 | 2.86 | 3.50 | — | — |

Other than in the examples herein, or unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

While this invention has been particularly shown and described with references to preferred embodiments thereof, it will be understood by those skilled in the art that various changes in form and details may be made therein without departing from the scope of the invention encompassed by the appended claims.

What is claimed is:

1. A composition, comprising:
a blend of a reprocessed or regrind polymer and a polyhydroxyalkanoate (PHA) additive,
wherein the PHA additive is a mixture of at least one poly(3-hydroxybutyrate-co-4-hydroxybutyrate) copolymer and a poly(3-hydroxybutyrate) homopolymer,
wherein the reprocessed or regrind polymer is a post-consumer recycled poly (vinyl chloride) (PVC), and
wherein the content of the PHA additive in the blend is from 10% to 20% by weight of the blend.

2. The composition of claim 1, wherein the PHA additive has a biobased content of 85-100%.

3. The composition of claim 1, wherein the at least one poly(3-hydroxybutyrate-co-4-hydroxybutyrate) copolymer, a poly(3-hydroxybutyrate) homopolymer, or both have a percent crystallinity less than 35%.

4. The composition of claim 1, wherein the at least one poly(3-hydroxybutyrate-co-4-hydroxybutyrate) copolymer, a poly(3-hydroxybutyrate) homopolymer, or both have an average molecular weight range of about 250,000 to about 2.5 million g/mole.

5. The composition of claim 1, wherein the at least one poly(3-hydroxybutyrate-co-4-hydroxybutyrate) copolymer has a content of 4-hydroxybutyrate (4HB) from 8% to 50% by weight of the copolymer.

6. The composition of claim 1, wherein the composition has a biobased content of 8.5-46%.

7. The composition of claim 1, further comprising one or more additional additives.

8. The composition of claim 7, wherein the one or more additional additives are selected from plasticizers, peroxide initiators, clarifiers, nucleating agents, thermal stabilizers, oxidative stabilizers, inorganic fillers, anti-slip agents, compatibilizers, and blocking agents.

9. The composition of claim 7, wherein the one or more additional additives are biobased.

10. The composition of claim 1, wherein the blend has at least one improved material property selected from a tensile modulus, tensile stress at yield, tensile strain at yield, tensile stress at break, energy at break, and tear, compared to the reprocessed or regrind polymer alone.

11. The composition of claim 10, wherein the improved material properties are tensile and tear properties.

12. The composition of claim 1, wherein the post-consumer recycled PVC and the PHA additive are miscible.

13. The composition of claim 1, wherein the composition is flexible, semi-rigid or rigid.

14. The composition of claim 1, wherein the post-consumer recycled PVC was thermally processed and extruded.

15. A method of preparing a composition, comprising:
melt blending a reprocessed or regrind polymer and a polyhydroxyalkanoate (PHA) additive, wherein the PHA additive is a mixture of a poly(3-hydroxybutyrate) and at least one poly(3-hydroxybutyrate-co-4-hydroxybutyrate) copolymer, using a single or twin screw extruder, two-roll mill, or Banbury mixer, thereby producing a blend;
wherein the content of the PHA additive in the blend is from 10% to 20% by weight of the blend,
wherein the reprocessed or regrind polymer is a post-consumer recycled poly(vinyl chloride) (PVC) that was thermally processed and extruded.

* * * * *